United States Patent
Jafa et al.

(10) Patent No.: US 7,933,820 B2
(45) Date of Patent: Apr. 26, 2011

(54) METHOD AND APPARATUS FOR COMPILING DATA FROM PROPERTY TITLE DOCUMENTS

(75) Inventors: Evan H. Jafa, Irvine, CA (US); Nicholas M. Look, Lake Forest, CA (US)

(73) Assignee: Data Trace Information Services, LLC, Santa Ana, CA (US)

( * ) Notice: Subject to any disclaimer, the term of this patent is extended or adjusted under 35 U.S.C. 154(b) by 827 days.

(21) Appl. No.: 11/331,456

(22) Filed: Jan. 13, 2006

(65) Prior Publication Data
US 2007/0174070 A1    Jul. 26, 2007

(51) Int. Cl.
*G06Q 40/00* (2006.01)
(52) U.S. Cl. ............................... 705/35; 705/38
(58) Field of Classification Search .............. 705/35, 705/38
See application file for complete search history.

(56) References Cited

U.S. PATENT DOCUMENTS

| | | | |
|---|---|---|---|
| 6,985,902 B2 | 1/2006 | Wise et al. | |
| 7,146,407 B2 * | 12/2006 | McNulty et al. | 709/217 |
| 7,548,884 B1 * | 6/2009 | Thomas | 705/38 |
| 7,584,167 B1 * | 9/2009 | Bell | 1/1 |
| 7,693,765 B2 * | 4/2010 | Dell Orfano | 705/35 |
| 7,751,624 B2 * | 7/2010 | Cantral | 382/190 |
| 2003/0036922 A1 * | 2/2003 | Fries | 705/1 |
| 2003/0041063 A1 | 2/2003 | Brady | |
| 2003/0229592 A1 * | 12/2003 | Florance et al. | 705/51 |
| 2005/0065928 A1 * | 3/2005 | Mortensen et al. | 707/5 |
| 2005/0114400 A1 | 5/2005 | Rao | |
| 2005/0119908 A1 * | 6/2005 | Hippe et al. | 705/1 |
| 2006/0020541 A1 * | 1/2006 | Gommlich | 705/40 |

OTHER PUBLICATIONS

Real Estate Documents Filed Electronically With Bexar County Clerk Via Landata Technologies e-Recording System PR Newswire. New York: Sep 13, 2004. p. 1.*
Landata Technologies Inc. Names Cellura President and CEO PR Newswire. New York: Mar 8, 2004. p. 1.*

* cited by examiner

*Primary Examiner* — Lalita M Hamilton
(74) *Attorney, Agent, or Firm* — Snell & Wilmer L.L.P.

(57) ABSTRACT

A method and apparatus for collecting property data from sources using a mobile device, such as a tablet pc, and to upload that property data to a database. The property data is then proofed and immediately returned to the searcher using the mobile device for error corrections. If there are no errors, the method and apparatus of the invention saves the data and returns the requested property data to the requester. If there are errors, the method and apparatus of this invention requests revisions from the searcher, proofs the order again, and returns the requested property data to the requester.

27 Claims, 26 Drawing Sheets

| Mercury: Order Form | | | | |
|---|---|---|---|---|
| Muni: WESTFIELD TOWN<br>Due: 9/15/2005 | County: UNION<br>Client ID: SAMPLE | Muni #: 908-789-4051<br>Client #: 800 597 2228 | Title#: SAMTESTUCON<br>Ordered: 9/8/2005 | |

* Special Instructions *

NONE ☐　　　　　　　　　Tax Information

| Amt Billed | PIF | PTL | O+P | Amt Paid | Date Paid | Amt Open | Open Int Amt | Open Int Date | STP |
|---|---|---|---|---|---|---|---|---|---|
| 2004 Taxes<br>8,760.60 | ☐ | ☐ | ☐ | | ☐10/07/2005 ▽ | | | ☐10/07/2005 ▽ | ☐ |
| Remark: *Select One* | | | | | | | | | |
| 2005 Qtr #1<br>2,190.15 | ☐ | ☐ | ☐ | | ☐10/07/2005 ▽ | | | ☐10/07/2005 ▽ | ☐ |
| Remark: *Select One* | | | | | | | | | |
| 2005 Qtr #2<br>2,190.15 | ☐ | ☐ | ☐ | | ☐10/07/2005 ▽ | | | ☐10/07/2005 ▽ | ☐ |
| Remark: *Select One* | | | | | | | | | |
| 2005 Qtr #3<br>2,394.25 | ☐ | ☐ | ☐ | | ☐10/07/2005 ▽ | | | ☐10/07/2005 ▽ | ☐ |
| Remark: *Select One* | | | | | | | | | |
| 2005 Qtr #4<br>2,394.25 | ☐ | ☐ | ☐ | | ☐10/07/2005 ▽ | | | ☐10/07/2005 ▽ | ☐ |
| Remark: *Select One* | | | | | | | | | |
| 2006 Qtr #1<br>2,292.20 | ☐ | ☐ | ☐ | | ☐10/07/2005 ▽ | | | ☐10/07/2005 ▽ | ☐ |
| Remark: *Select One* | | | | | | | | | |
| 2006 Qtr #2<br>2,292.20 | ☐ | ☐ | ☐ | | ☐10/07/2005 ▽ | | | ☐10/07/2005 ▽ | ☐ |
| Remark: *Select One* | | | | | | | | | |

209 — [ Validate ]　[ Edit ]

NONE ☐　　　　　　　　　Assessments

| Muni: WESTFIELD TOWN | County: UNION | Muni #: 908-789-4051 | Title#: SAMTESTUCON |
|---|---|---|---|
| Due: 9/15/2005 | Client ID: SAMPLE | Client #: 800 597 2228 | Ordered: 9/8/2005 |

* Special Instructions *

NONE ☐  Assessments

Added
NONE: ☐

Remark Only: ☐  Remark: [*Select One*]

| 2004 (4th Qtr): | #M: 0 | 2005 (1st Qtr): | 2005 (2nd Qtr): |
|---|---|---|---|
| Pmt Staus: [*Select One*] | | Pmt Staus: [*Select One*] | Pmt Staus: [*Select One*] |

Add  Update  Remove

| remark_only | remark | amount_4_qt | amount_1_qt | amount_2_qt | payment_stat | payment_stat | payment_stat | open_interest |
|---|---|---|---|---|---|---|---|---|

211 — [Done] [Edit]

Confirmed
NONE: ☐

Remark Only: ☐  Remark: [*Select One*]

| Order #: | Purpose: | Confirmed: 10/07/2005 | Orig $: |
|---|---|---|---|
| Tot # Inst: | Inst Amt $: | Paid $: | # Inst Due: |
| Due $: | | | |

| | remark_only | remark | original | number_of_i | number_inst | paid | inst_amount | due_amount | confirmed_a |
|---|---|---|---|---|---|---|---|---|---|
| ▷ | 0 | | | | | | | | 92-15 |
| | 0 | | | | | | | | 93-20 |
| | 0 | | | | | | | | 93-21 |
| | 0 | | | | | | | | 95-15 |

| Mercury: Order Form | | | | _ □ X |
|---|---|---|---|---|
| Muni: WESTFIELD TOWN<br>Due: 9/15/2005 | County: UNION<br>Client ID: SAMPLE | Muni #: 908-789-4051<br>Client #: 800 597 2228 | Title#: SAMTESTUCON<br>Ordered: 9/8/2005 | |

* Special Instructions *

NONE ☐                    Utilities

Remark Only: ☐   Remark: [*Select One*                                    ▽]
Utility: [*Select One*▽]  Type: [Select Utility First ▽]  Acct #: [    ]  From: [☐10/07/2005▽]  To: [☐10/07/2005▽]
Amount 1: [    ]           Amount 2: [    ]                Amount 2: [    ]
Pmt Status: [*Select One*▽]  Pmt Status: [*Select One*▽]  Pmt Status: [*Select One*▽]

Add   Update   Remove

| remark_only | remark | amount_4_qt | type | account | utility_from | utility_to | amount_1 | payment_sta |
|---|---|---|---|---|---|---|---|---|

214 — [ Done ]  [ Edit ]

NONE ☐                    Liens

Remark Only: ☐   Remark: [*Select One*                                    ▽]
Year: [        ]              Type: [*Select One*▽]       Sale Amt $: [    ]
Cert #: [      ]              Sold On: [☐10/07/2005▽]         Sold To: [    ]

| remark_only | remark | year | type | sale_amount | cert_number | sold_on | sold_to |
|---|---|---|---|---|---|---|---|

217 — [ Done ]  [ Edit ]

| Mercury: Order Form | | | | □|X |
|---|---|---|---|---|
| Muni: WESTFIELD TOWN<br>Due: 9/15/2005 | County: UNION<br>Client ID: SAMPLE | Muni #: 908-789-4051<br>Client #: 800 597 2228 | Title#: SAMTESTUCON<br>Ordered: 9/8/2005 | |

* Special Instructions *

| info | type | year | quarter | amount | payment_sta | open_interest | open_interest | due_date |
|---|---|---|---|---|---|---|---|---|
| | | | | | | | | |

[ Done ]  [ Edit ]

NONE ☐        Unconfirmed Assessments                    ⊗

Remark Only: ☐   Remark: [*Select One*                    ▽]

Ordinance #: [        ]   Adopted On: [10/07/2005 ▽]   Type of Improvement: [*Select One* ▽]

Add   Update   Remove

| | remark_only | remark | ordinance_nu | type_of_imp | adopted_on_ |
|---|---|---|---|---|---|
| ▷ | 0 | | 2002-14 | ROAD & SID | 8/20/2002 |
| | 0 | | 93-20 | ROAD & SID | 8/20/2002 |
| | 0 | | 93-21 | ROAD & SID | 8/20/2002 |

[ Done ]  [ Edit ]

Date Completed: [10/07/2005 ▽]—222           224—Searchers Initials: [    ]

Searchers Comments:

225—              228

226—[ Submit ]   [ Cancel ]   [ Hold ]—230

FIG. 5

| Mercury: Order Form | | | |
|---|---|---|---|
| Muni: WESTFIELD TOWN<br>Due: 9/15/2005 | County: UNION<br>Client ID: SAMPLE | Muni #: 908-789-4051<br>Client #: 800 597 2228 | Title#: SAMTESTUCON<br>Ordered: 9/8/2005 |

* Special Instructions * — 231

Proofer Comments: Please fill in the entire utility section.
Client Note: IF EXTENDED GRACE PERIOD: DO NOT CHANGE DUE DATE-PUT AFTER AMOUNT

Physical Information

Block: 3403  Owner: VALLARO, ANTHONY L & SALOME M
Lot: 27  Mail Add: 501 WELLS ST  City,State,Zip: WESTFIELD, NJ 07090
Qual:  Prpty Add: 501 WELLS ST
XLots:  Description:
Property Code: 2-Residential  Lot Size: 65.77X127  Tax Rate: 005.840

Exemptions:

Exemptions: *Select One*   No. of Exmpt:   Exemptions Remark: *Select One*

Add   Update   Remove

| exemption_type | number_of_exempt | remark |
|---|---|---|

[ Done ]  [ Edit ]

Value

Land Val$: 84600
Imp. Val$: 72400
Abatement:
Total Val$: 157000

[ Done ]  [ Edit ]

NONE ☐   Tax Information

FIG. 9

EXAMPLE MATRIX FIELD

| FIELD #2: | TAX AUTOMATION TYPE |
|---|---|
| DATA SOURCE ?: | PROPERTY DATA DATABASE |
| FIELD VAULES: | 1. TSU<br>2. FARETS TAF FILE<br>3. FARETS TPS FILE<br>4. OTHER<br>5. NONE |
| DO WHAT WITH THE DATA ? : | DETERMINE WHETHER A MUNICIPALITY HAS AUTOMATION. — 300 |
| APPLY A RULE TO THE DATA ?: | YES — 302 |
| IF " YES," WHAT/HOW ?: | IF AUTOMATION IS AVAILABLE USE IT — 304 |
| NOTE: | IN THE FUTURE, THE "FIELD VALUES" MAY EXPAND IN THIS FIELD. |

FIG. 10

EXAMPLE MATRIX FIELD

| FIELD #14: | BANKRUPTCY (FIELD RESEARCH REQUIRED) |
|---|---|
| DATA SOURCE ?: | PROPERTY DATA DATABASE |
| FIELD VAULES: | YES: NO |
| DO WHAT WITH THE DATA ? : | DETERMINE WHETHER PROPERTY HAS BANKRUPTCY BILLING THAT REQUIRE FIELD RESEARCH — 306 |
| APPLY A RULE TO THE DATA ?: | YES — 308 |
| IF "YES," WHAT/HOW ?: | IF BANKRUPTCY FLAG IS INDICATED ORDER MUST GO TO THE MOBILE DEVICE FOR MANUAL RESEARCH — 310 |

FIG. 13

TURNAROUND TIME REPORT

DATE RANGE: 03/04/04  TO: 04/04/04
LOC: ALL NJ MUNICIPALITIES

| MUNI | 1HR | 2HRS | 3HRS | 4HRS | 5HRS | 6HRS | 7HRS | 8HRS | <2 DAYS | <3 DAYS | DAYS | OUTST | TOT. |
|---|---|---|---|---|---|---|---|---|---|---|---|---|---|
| ABSECON | 0 | 0 | 6 | 0 | 0 | 0 | 0 | 0 | 0 | 2 | 0 | 2 | 10 |
| CUM. % | 0.00% | 0.00% | 60.00% | 60.00% | 60.00% | 60.00% | 60.00% | 60.00% | 60.00% | 80.00% | 80.00% | 100.00% | |
| ALANTIC CITY | 0 | 0 | 0 | 0 | 15 | 10 | 0 | 0 | 3 | 0 | 0 | 0 | 30 |
| CUM. % | 0.00% | 0.00% | 0.00% | 0.00% | 50.00% | 83.33% | 83.33% | 83.33% | 100.00% | 100.00% | 100.00% | 100.00% | |
| TOTALS: | 0 | 0 | 6 | 0 | 15 | 10 | 0 | 0 | 5 | 2 | 0 | 2 | 40 |
| CUM. % | 0.00% | 0.00% | 15.00% | 15.00% | 62.50% | 77.60% | 77.50% | 77.50% | 90.00% | 95.00% | 95.00% | 100.00% | |

FIG. 14

TABLET ORDER TRACKING – SUMMARY REPORT

386 — FIELD REP: SMITH, SAM  USER NAME: SSMITH  PASSWORD: XXXX
388 — TABLET#: 0001  HOME#: 123-555-1113  FAX#: 123-555-1114
      CELL#: 123-555-1112
390 — TODAY'S DATE: 03/30/05

NUMBER OF ORDERS IN THE QUEUE FOR THIS TERRITORY: 16 — 392
NUMBER OF ORDERS IN THE SYSTEM FOR THIS TERRITORY: 24 — 394
PERCENTAGE OF ORDERS IN THE QUEUE VS. THE SYSTEM: 66.6% — 396

398 — LAST DOWNLOAD TIME: 06:00 PM
      ELAPSED TIME SINCE LAST DOWNLOAD: 04:32

400 — LAST UPLOAD TIME: 06:00 PM
      ELAPSED TIME SINCE LAST UPLOAD: 04:32

FIG. 15

TABLET ORDER TRACKING – DETAIL REPORT

- 402 — FIELD REP: SMITH, SAM
- 404 — TABLET#: 0001
- CELL#: 123-555-1112
- TODAY'S DATE: 03/30/05
- CURRENT TIME: 02:00PM

USER NAME: SSMITH
HOME#: 123-555-1113

PASSWORD: XXXX
FAX#: 123-555-1114

| ORDER NUMBER | TIME DOWNLOADED | STATUS | COMPLETED TIME | ELAPSED TIME |
|---|---|---|---|---|
| NAM-04-2019 | 09:05AM | COMPL. | 12:15PM | 3H, 10M |
| NAM-05-3342 | 09:15AM | OUTST. |  | 4H, 45M |

406 — (ORDER NUMBER)
416 — (NAM-05-3342)
408 — (TIME DOWNLOADED)
410 — (STATUS COMPL.)
418 — (OUTST.)
412 — (COMPLETED TIME)
414 — (3H, 10M)
420 — (4H, 45M)

FIG. 16

ORDER VOLUME REPORT

DATE RANGE: 06/01/05 TO 07/01/05

| COUNTY | MUNICIPALITY | MUNI CODE | VOLUME |
|---|---|---|---|
| ATLANTIC | ABSECON CITY | 0101 | 25 |
| ATLANTIC | ATLANTIC CITY, CITY | 0102 | 90 |
| ATLANTIC | BRIGANTINE CITY | 0103 | 13 |
| | TOTAL VOLUME: | | 128 |

422 — DATE RANGE
424 — MUNICIPALITY
426 — VOLUME
428 — TOTAL VOLUME
430 —
432 —

FIG. 17

REJECTED DURING ORDER PROCESSING-DETAIL REPORT

DATE: 03/30/05

| TITLE# | CLIENT | BLOCK# | LOT# | QUAL | MUNICIPALITY | DATE TIME REC. | REASON |
|---|---|---|---|---|---|---|---|
| NAM-04-2019 | NOA-C | 27 | 2 | | WEST LONG BRANCH | 03/30/05-09:05AM | NO MATCH IN PROPERTY MASTER FILE |
| NAM-05-2254 | NOA-X | 33 | 9 | | FREEHOLD BORO | 03/30/05-09:20AM | NO MATCH IN PROPERTY DATA DATABASE |

(DISPLAYED FROM OLDEST TO NEWEST)

434 — CLIENT
436 — REASON
438 —
440 —

FIG. 18

REJECTED DURING ORDER PROCESSING-SUMMARY REPORT

DATE RANGE: 06/01/05 TO 07/01/05
SORT TYPE: GEOGRAPHY

TOTAL REJECTED DUE TO NO MATCH IN THE PROPERTY MASTER FILE: 125
TOTAL REJECTED DUE TO NO MATCH IN THE PROPERTY DATA DATABASE: 63
TOTAL REJECTED DUE TO A DIFFERENT OWNER'S NAME: 7

TOTAL NUMBER OF ORDERS REJECTED: 195

FIG. 19

REJECTED DURING PROOFING-DETAIL REPORT

DATE: 06/01/05 TO 07/01/05
FIELD REP: CRAIG

| TITLE# | CLIENT | BLOCK# | LOT# | QUAL | MUNICIPALITY | DATE TIME REC. | REASON |
|---|---|---|---|---|---|---|---|
| NAM-04-2019 | NOA-C | 27 | 2 | | WEST LONG BRANCH | 03/30/05-09:05AM | MISSING WATER COMMENT |
| NAM-05-2254 | NOA-X | 33 | 9 | | FREEHOLD BORO | 03/30/05-09:20AM | MATH ERROR ON TAXES |

FIG. 20

REJECTED DURING ORDER PROCESSING—SUMMARY REPORT

DATE RANGE: 06/01/05 TO 07/01/05
SORT TYPE: CRAIG

TOTAL REJECTED DUE TO MISSING WATER COMMENT: 6
TOTAL REJECTED DUE TO MATH ERROR ON TAXES: 13

TOTAL NUMBER OF ORDERS REJECTED: 19

FIG. 21a

ORDER LIFE-CYCLE REPORT
DATE RANGE: 8/17/2005 TO 8/22/2005
SEARCH SORT: LOVING, LINDA

| | TIME ORDERED | TIME ORDERED DOWNLOADED BY SEARCHER | TIME ORDER UPLOADED FROM SEARCHER |
|---|---|---|---|
| 8/17/2005<br>05-0313<br>ELASPED TASK TIME<br>CUM. ELASPED TIME | 8/17/2005 08:45:48 PM | 8/15/2005 12:10:40 PM<br>15 HOURS, 25 MINS<br>15 HOURS, 25 MINS | 8/18/2005 04:05:38 PM<br>3 HOURS, 55 MINS<br>19 HOURS, 20 MINS |
| 8/18/2005<br>05MH47510<br>ELASPED TASK TIME<br>CUM. ELASPED TIME | 8/18/2005 12:26:36 PM | 8/18/2005 04:09:39 PM<br>3 HOURS, 43 MINS<br>3 HOURS, 43 MINS | 8/19/2005 02:20:59 PM<br>22 HOURS, 11 MINS<br>1 DAYS 1 HOURS, 54 |
| 8/18/2005<br>1942658-T<br>ELASPED TASK TIME<br>CUMULATIVE TIME | 8/18/2005 10:44:48 PM | 8/18/2005 12:10:46 PM<br>1 HOURS, 26 MINS<br>1 HOURS, 26 MINS | 8/18/2005 4:09:27 PM<br>3 HOURS, 59 MINS<br>5 HOURS, 25 MINS |
| 8/17/2005<br>W-90576-F<br>ELASPED TASK TIME<br>CUM. ELASPED TIME | 8/17/2005 05:19:51 PM | 8/18/2005 12:10:42 PM<br>18 HOURS, 51 MINS<br>18 HOURS, 51 MINS | 8/18/2005 04:02:15 PM<br>3 HOURS, 52 MINS<br>22 HOURS, 43 MINS |
| 8/19/2005<br>W-90712-FG<br>ELASPED TASK TIME<br>CUM. ELASPED TIME | 8/19/2005 04:32:26 PM | 8/22/2005 12:05:11 PM<br>2 DAYS 19 HOURS, 33 MINS<br>2 DAYS 19 HOURS, 33 MINS | 8/22/2005 02:23:45 PM<br>2 HOURS, 18 MINS<br>2 DAYS 21 HOURS, 5 MINS |
| AVERAGE ELAPSED TIME | | 13 HOURS, 12 MINS | 20 HOURS, 41 MINS |
| AVERAGE CUMULATIVE TIME | | 13 HOURS, 12 MINS | 1 DAYS, 9 HOURS, 53 MINS |

FIG. 21b

| ORDER LIFE-CYCLE REPORT | | |
|---|---|---|
| DATE RANGE: 8/17/2005 TO 8/22/2005 — 504 | | 506 |
| SEARCH SORT: LOVING, LINDA | | |
| TIME ORDER PROOFED BY PROOFER | TIME ORDER WAS COMPLETED FOR CUSTOMER | TOTAL TURNAROUND TIME |
| 8/18/2005 04:11:31 PM<br>0 HOURS, 06 MINS<br>19 HOURS, 26 MINS | 5/15/2005 04:11:31 PM<br>0 HOURS, 06 MINS<br>19 HOURS, 26 MINS | 19 HOURS, 26 MINS |
| 8/19/2005 02:23:30 PM<br>3 HOURS, 03 MINS<br>1 DAYS 1 HOURS, 57 MINS | 8/19/2005 02:23:30 PM<br>0 HOURS, 03 MINS<br>1 DAYS, 1 HOURS, 57 MINS | 1 DAYS, 1 HOURS, 57 |
| 8/18/2005 04:11:46 PM<br>0 HOURS, 02 MINS<br>5 HOURS, 27 MINS — 516 | 8/16/2005 04:11:46 PM<br>0 HOURS, 02 MINS<br>5 HOURS, 27 MINS — 518 | 5 HOURS, 27 MINS — 520 |
| 8/18/2005 04:14:51 PM<br>0 HOURS, 12 MINS<br>22 HOURS, 55 MINS | 8/18/2005 12:10:46 PM<br>0 HOURS, 12 MINS<br>22 HOURS, 55 MINS | 22 HOURS, 55 MINS |
| 8/18/2005 2:33:36 PM<br>0 HOURS, 10 MINS<br>2 DAYS, 22 HOURS, 01 MINS | 8/22/2005 02:33:36 PM<br>0 HOURS, 10 MINS<br>2 DAYS 22 HOURS, 01 MINS | 2 DAYS, 22 HOURS, 01 MINS |
| 0 HOURS, 10 MINS — 540 | 13 HOURS, 23 HOURS, 35 MINS — 542 | 13 HOURS, 32 MINS — 534 |
| 1 DAYS, 10 HOURS, 03 MINS — 530 | 1 DAYS, 23 HOURS, 35 MINS — 532 | 1 DAYS, 23 HOURS, 35 MINS — 544 |

METHOD AND APPARATUS FOR COMPILING DATA FROM PROPERTY TITLE DOCUMENTS

FIELD OF THE INVENTION

The invention relates to real estate valuation and more specifically to a method and apparatus for compiling data from property title documents. The method and apparatus may provide quick and accurate acquisition of title data.

BACKGROUND OF THE INVENTION

Property title and tax information is valuable data. It is useful to financial institutions such as lenders on real estate and it is useful to real estate purchasers and to agents acting on behalf of real estate purchasers. The typical process by which title and tax data for a subject property is acquired takes a series of days, usually utilizing a fax machine for the request, a title searcher going to a particular public office and requesting information for a subject property, receiving the requested information and then faxing the information back to the requesting party. The information is then verified and input by hand into a database.

This process usually takes a number of days. Typically, the data is inputted from public records onto a sheet of paper, which is then transmitted by facsimile to a central repository and which is then inputted by hand into a computer. These multiple steps enable there to be many places in which the data can be incorrectly taken down or inputted. Therefore, there exists a need in the art for a faster and more accurate method of collecting title and tax data for subject properties and inputting that data into a database of collected property title and tax data.

SUMMARY OF THE INVENTION

According to the invention, a method and apparatus are described where title and tax data for a subject property may be collected quickly and accurately. The invention starts when someone requests title or tax data for a subject property. The request for this data is then stored in a database server. The first step, once the order is entered, is to check the current database of properties to see if there is already an up-to-date entry on the subject property or properties. If the entry exists, the data is used to fill in the requested data, if no entry is found, then a search request is created and put in a queue of orders to be filled. A searcher collects the orders in real-time using an internet device that is periodically or persistently connected.

The searcher then gathers the data, inputting it into a form, such as an electronic form in the preferred embodiment, which is then immediately sent over the internet to a validation center. The data is then validated to ensure that it is correct and it is then added to the current database of properties and used to respond to the request for title and tax data. The process may be completed within 8 hours to one day of the property data request. It is therefore substantially faster than the prior art, while providing less room for human error.

The invention improves upon the prior art in numerous ways. The method and apparatus of the invention is faster and more efficient than other prior art methods because the orders may be downloaded by the searcher immediately after they are requested. The invention is less susceptible to human error than prior art methods because there is only one point of data entry and this data is subsequently checked by validation rules built into the electronic form before the order is completed. The invention is also capable of more quickly handling large title and tax data requests, by eliminating unnecessary human interaction which typically slows down the process of gathering data. It is therefore an object of the invention to improve in terms of accuracy and time on all prior art methods. It is a further object of the invention to improve upon the prior art by being able to better handle large volumes of requests more efficiently. It is an additional object of the invention to provide greater accuracy both through single point of input and subsequent validation of the property data before an order is completed. These and other objects of the invention will be described in or apparent from the following detailed description.

BRIEF DESCRIPTION OF THE DRAWINGS

FIGS. 4a-4f are example order forms.
FIG. 5 is an example order form similar to FIG. 4a with the addition of comments from a proofer.
FIG. 9 is an example matrix field.
FIG. 10 is an additional example matrix field.
FIG. 13 depicts a turnaround time report.
FIG. 14 depicts a tablet order tracking summary report.
FIG. 15 depicts a tablet order tracking detail report.
FIG. 16 depicts an order volume report.
FIG. 17 depicts a rejected during order processing detail report.
FIG. 18 depicts a rejected during order processing summary report.
FIG. 19 depicts a rejected during proofing detail report.
FIG. 20 depicts a rejected during proofing summary report.
FIGS. 21a and 21b depict an order life-cycle report.

DETAILED DESCRIPTION OF THE INVENTION

The invention provides a method and apparatus for compiling property data from title and tax documents and other sources, most notably in-house data stores or 3rd party data stores. These sources can be the electronic sources that make the new method more efficient. Typically in prior art methods, these sources are not available digitally via the internet or other sources, so searchers are used to gather the data. Using this invention, the data is gathered manually, but input into a remote device that maintains internet connectivity. The data is then uploaded to a proofing database and then stored to be delivered to the data requester as quickly as possible after it is collected.

Figure 1A:
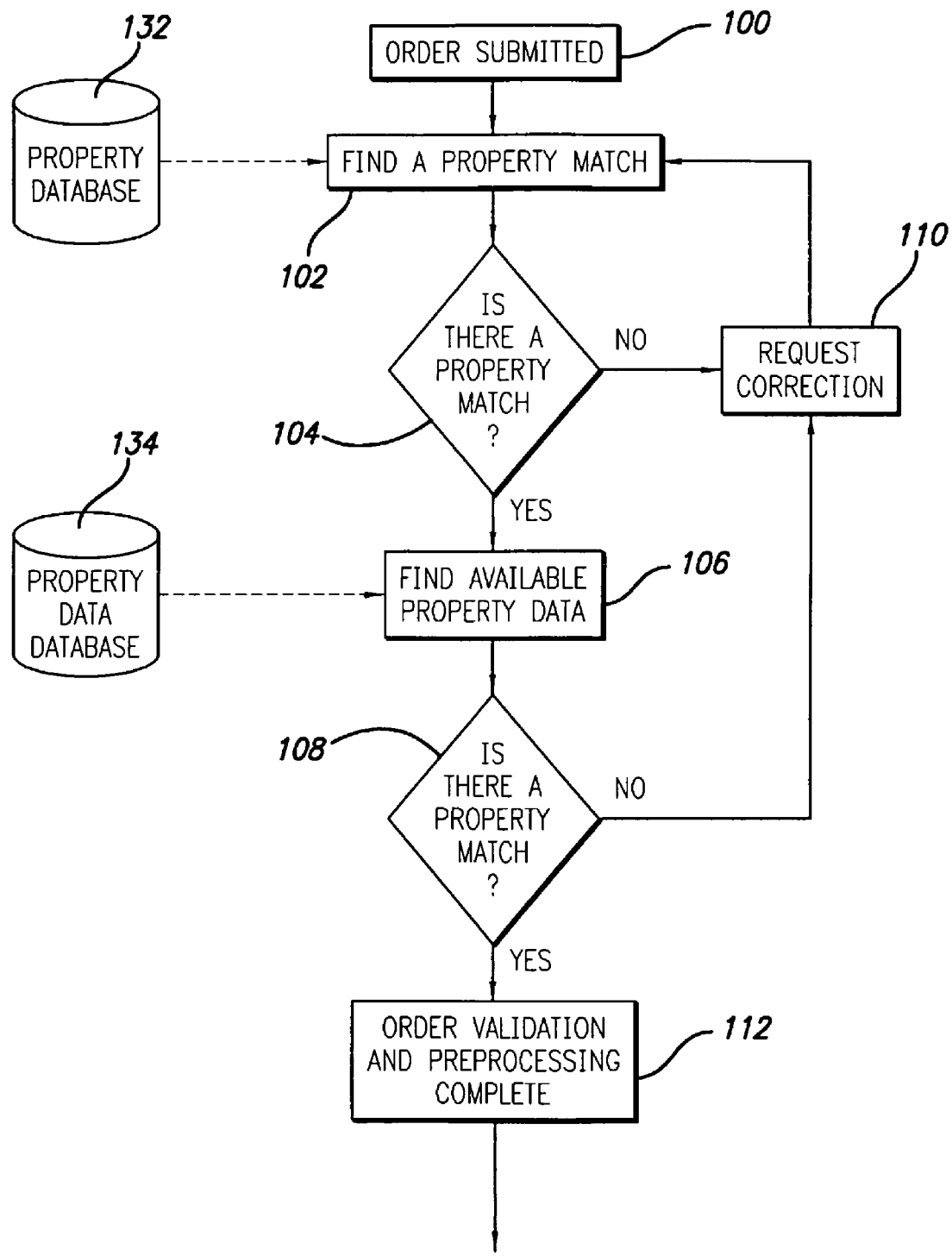
FIGS. 1a and 1b are a depiction of a flowchart of the method of the preferred embodiment.
Figure 1B:
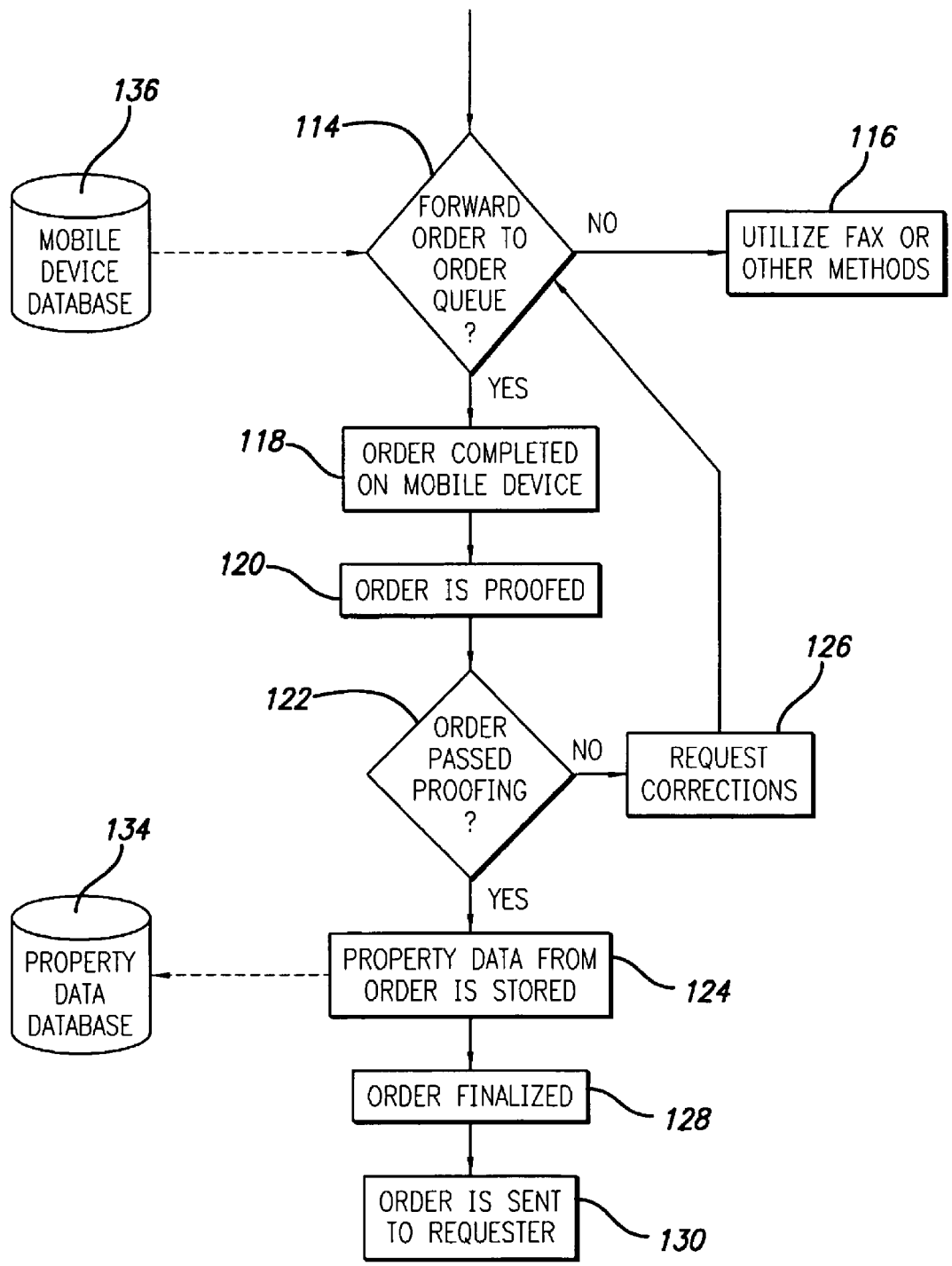

Referring first to FIGS. 1a and 1b, an example preferred embodiment method flowchart is depicted. In the first step of this method, the order is submitted 100. In this step a request is made for title, tax and other information pertaining to a property, typically by web-submission, but requests may also via facsimile or telephone call. If this request is done via the web-submission, it is correctly formatted by the computer accepting the web-submission and is then forwarded on to the next step. If the order is submitted by facsimile or phone, then the order is inputted into the computer before going on to the next step. In the next step, the processing server attempts to find a property match 102. This step is used to standardize the property information so that the correct property is identified for title and tax search. If a property match cannot be found, then the property may not exist or the data requested may incorrectly identify the property. To perform this search, the processing server attempts to look in a property database 132. The property database 132 is simply a database designed to respond to queries for addresses or other indicia of properties with a "found" or "not found" answer and the formatting (if its different than was submitted) of the property address or other identification for the property.

For example, if a user input 1234 N. Maple #3 in the first address line, but the property database 132 had two separate inputs, one for address, one for apartment number, it might respond that it has found the property but that the address is not quite right. It might correctly identify the property to find a property match, but would respond that the proper address is 1234 N. Maple and that the proper apartment number is 3, since, in the property database 132, those two fields are separate from one another.

Next in element 104, the question is: "Is there a property match?" If this question is answered in the negative, the next step is to request a correction 110. If this step is taken, a correction is manually requested, typically by intervention of an individual in the process and then another attempt is made to find a property match 102. If this question is answered in the affirmative, then the method of the preferred embodiment moves on to element 106, which finds available property data. In this step, the property data database 134 is used to "fill in" information that is already known, for example, about the property, municipality and state. For example, assume that a request has been made for a particular home in the state of New Jersey. In this step, the property data database 134 provides information such as the title office that an individual searcher must go to find the information, its hours of operation, any additional tax information or tax office data (hours of operation, telephone numbers, address) and any information already known about the property. Also in this step, if available, the mobile device to be used for the search is selected, based upon the location of the property for which data is being requested. This mobile device, if available, will receive the order request and address it, as described later in the method as depicted. If a search has been done recently on that property, then possibly all requested data is already known and stored on the property data database 134. All available information of this sort, in an effort to aid the searcher on-site is appended to the order request in this step.

After this step, the find available property data 106 step, the method attempts to discover: "Is there a property match?" 108. This is to ensure that the property identified in the order exists. If the answer is in the negative, then a correction is requested 110. If the answer is in the affirmative, then the preferred embodiment moves on to the next portion of the method. In this step, depicted in element 112, the order validation and preprocessing are complete.

Next, referring to FIG. 1b, using the preferred method of this invention, it is determined whether or not the order request should be forwarded on to the order queue 114. To determine whether or not to use a mobile device to perform this search, a check is made to determine if a mobile device exists in the area in which the search must be made. A mobile device database 136 is used to perform this check. This database 136 may be housed on the same processing server. If not, then the method may utilize fax or other methods 116 to request the search from an individual searcher in the field. If there does exist a mobile device, then the order is forwarded on to the mobile device order queue.

At step 118, the order completion process begins on the mobile device after the device accesses and downloads it from the mobile device order queue. This involves the user of the mobile device using the mobile device to receive the order request information from the order queue, proceeding to the proper title searching or tax searching locales, receiving the information, inputting that information into the mobile device so that the mobile device can forward the filled order to be validated. Once the order is completed 118, the order is proofed 120. In the preferred embodiment, this involves an additional error checking computer, being administered by one or more operators, attempting to identify errors in the submitted completed orders. If an error is found, then corrections are requested 126 and the order is forwarded back to the mobile device 114 for corrections. If there are no errors, the property data from the order is stored 124, typically into the property data database 134.

Next, the order is finalized 128. In the preferred embodiment, finalizing involves the conversion of the text data into a PDF format for easy delivery to the requester. The filled completed order is sent to the requester 130. In the preferred embodiment, the PDF file containing the results of the order request are sent out automatically using the processing server to the requester's email address. Typically, the entire process will take less than one day if the title searcher can reach the office that day. The method is a substantial improvement over the prior art in terms of time and accuracy.

Figure 2:
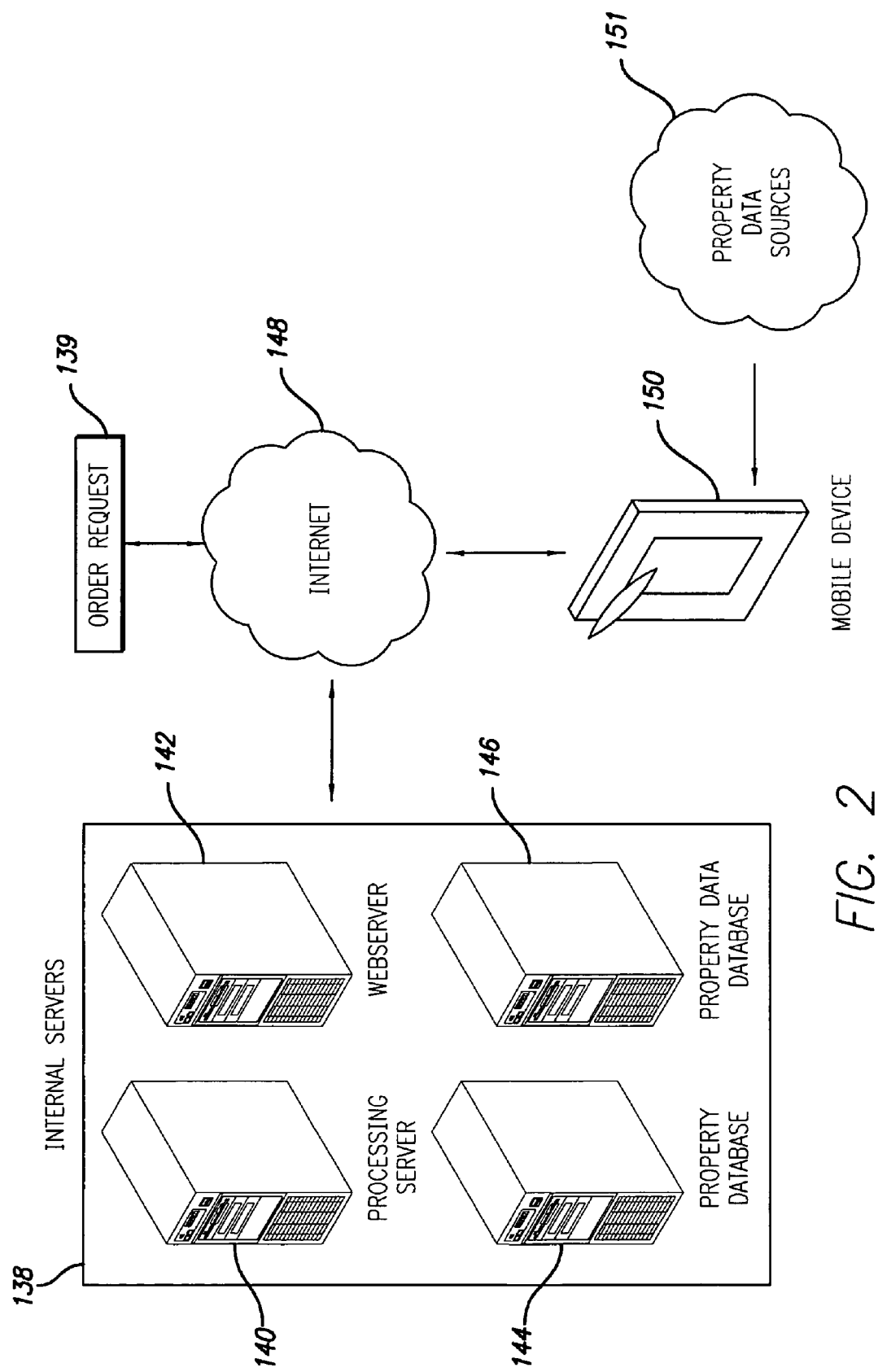
FIG. 2 is a depiction of the series of computers upon which the method of the preferred embodiment takes place.

Referring next to FIG. 2, the apparatus of the preferred embodiment of this invention is depicted. The elements depicted are various components or servers and the mobile device upon which the searcher receives and inputs orders. The first box is the grouping of internal servers 138. These servers are servers that are, in the preferred embodiment of the invention, internal to the order processor. In alternative embodiments, some or all of these servers may be maintained by individuals or companies other than the order-processor. For example, web servers are typically not maintained internally by businesses, they are instead outsourced to web-hosting companies. Similarly, many databases are maintained in server farms external to the corporations who utilize those servers. For purposes of simplicity, these servers may be maintained and hosted internally by the company which is processing orders.

The first component used in the preferred embodiment of the method of this invention is the processing server 140. The processing server 140 performs a great many functions in the process. The first function that it performs is to determine which orders have come in by checking the web server 142 database and forwarding those orders, if possible, along to the database from which the remote devices "pick up" their orders, from the order queue in the processing server 140. This database, in the preferred embodiment, is maintained on the processing server 140. In alternative embodiments, this database may be included on an additional server or servers. The processing server 140 also checks with the web server 142 database to determine when new orders have come in via the website through a new order request 139. Additionally, the processing server 140 sends orders to the property database 144 to determine if the property data has been entered correctly in the order itself. The processing server receives the "property match" and determines whether this property is properly identified. The processing server 140 database of orders to be "picked up" by the mobile device 150 also called the "order queue" is a listing, subdivided by the municipality or area in which the search is to be performed, where the mobile device may check to pick up new order requests.

Once the order has been filled, the processing server 140 of the preferred embodiment also maintains access to a database of completed orders prior to those completed orders being added to the property data database 146. These non-proofed orders are held until they are proofed at which point they are added to the property data database 146 as new property data. Finally, the processing server 140 interacts with the completed order data stored in the property data database 146 to send the data using the internet 148 in response to the order request 139.

The second component in the preferred embodiment is a web server 142. The web server 142 is responsible for receiving the web-created order requests. There may be additional error checking rules on the web server 142 to ensure that all relevant data is input properly to the order. For example, there may be requirements that the zip code for a particular property be inputted by the user. Additionally, there may be requirements that a zip code be 5 or 9 characters long, so as to conform to the requirements of the property database 144. The web server 142 maintains a database of current order submissions that will be accessed by the processing server 140 to gather the new orders before they are sent to the mobile devices 150.

The next component depicted is the property database 144. This database is a master file for addresses and properties that are accessible by the method of this invention. This property database 144 may or may not be maintained internally. The property database 144 may be an external service to which the user of this invention is granted access. The address or property for which title and tax information is requested is checked against this database to ensure that the property exists and that it is "findable" by another server. If the address is incorrect or partially correct, this database is used to correct this mistake or if that is not possible it will be used to notify a user of the system to correct this address or to request further clarification of the property for which the order request was made.

Figure 4A:
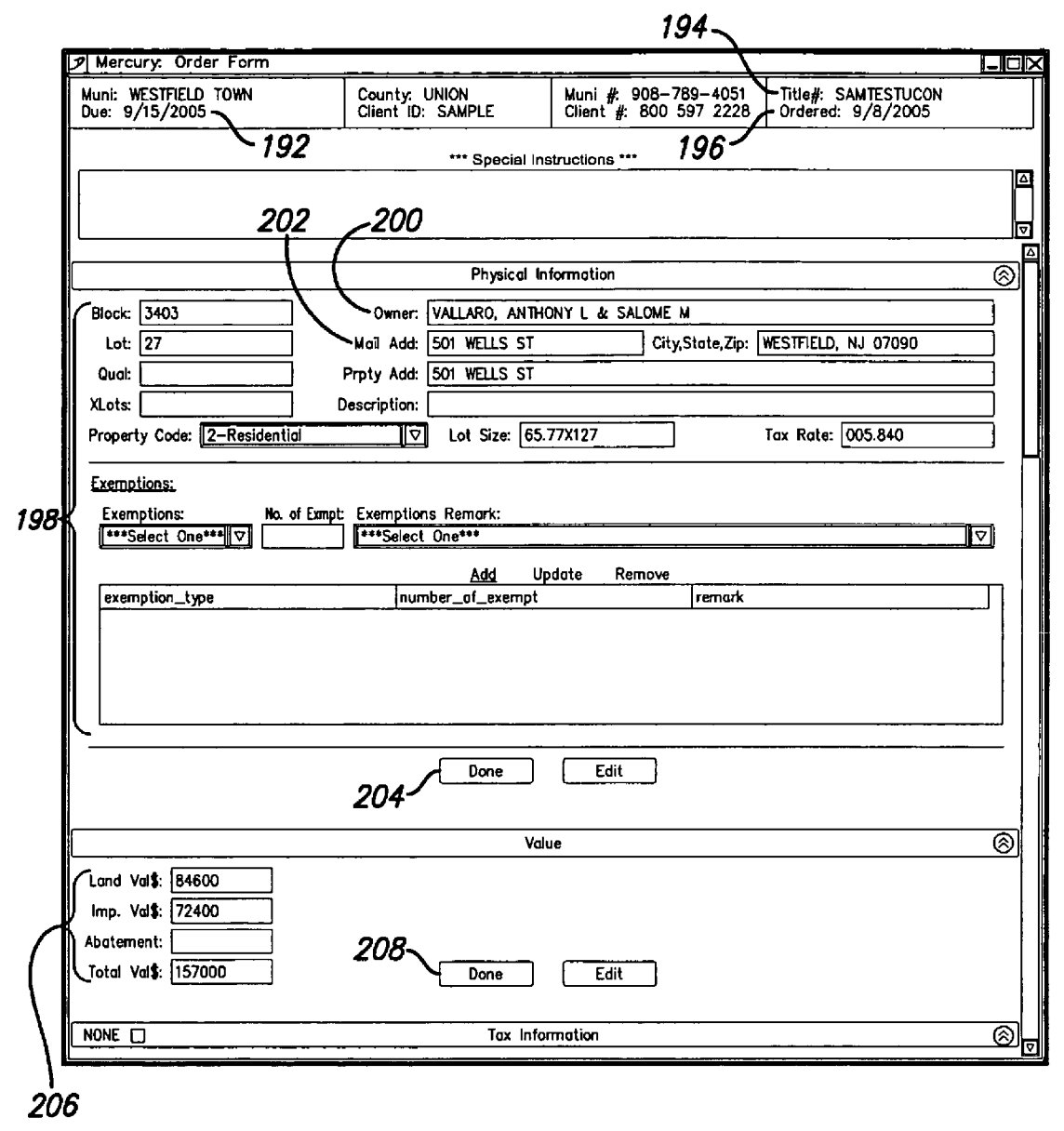
Figure 4E:
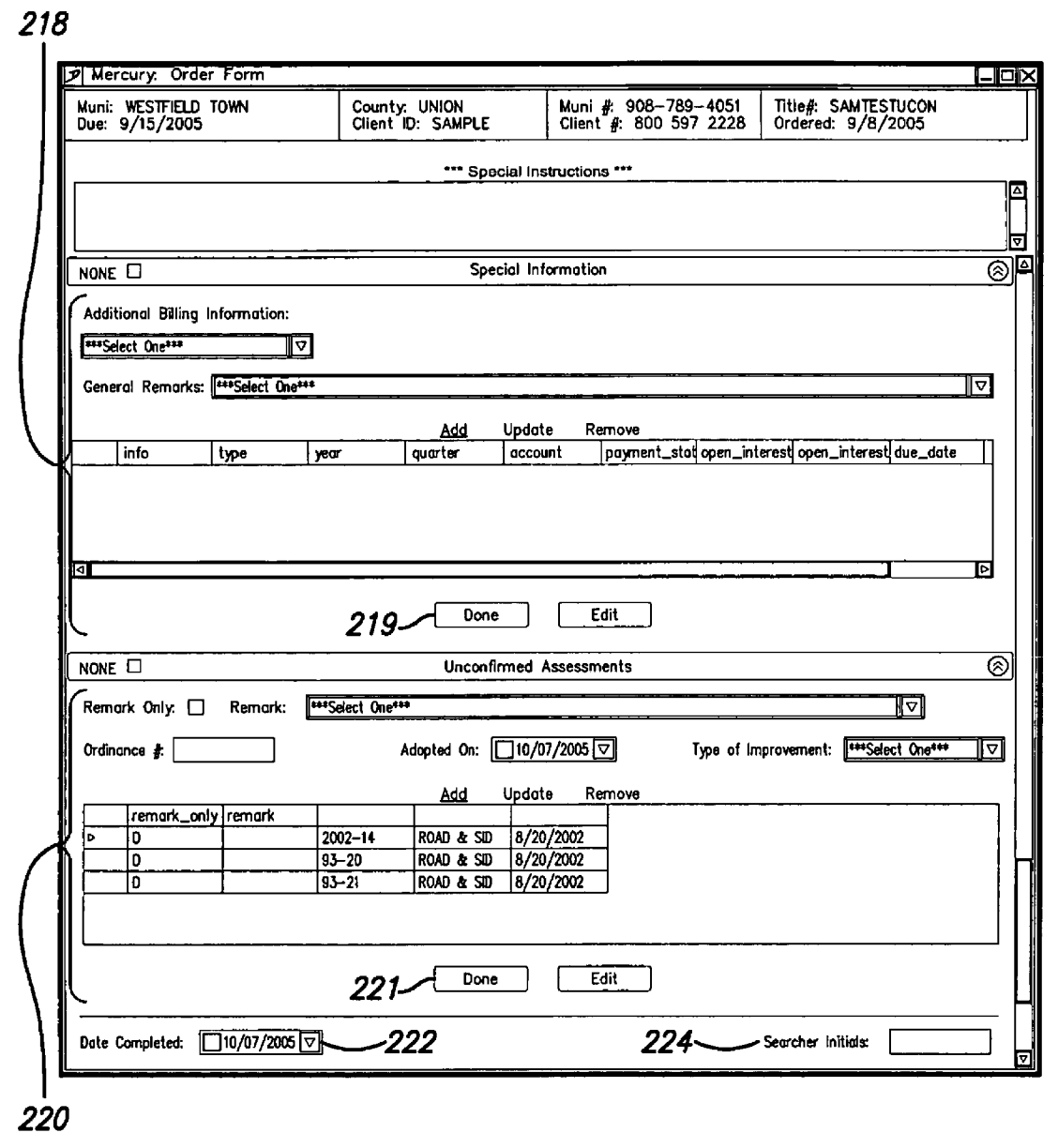

Another component of the apparatus of the preferred embodiment is the property data database 146. This database maintains data related to properties, such as information about the address, phone number, hours of operation, individuals to contact for information pertaining to a title search in a given municipality or county. Additionally, this database maintains state-specific and order specific information based upon a series of tables which maintain information for inclusion in the order requests that are downloaded by the mobile device 150. An example of some of the data that may be contained pertaining to a state or municipality is depicted later in FIG. 4. Additionally, the property data database 146 stores information on the particular property for which an order request was submitted. If a search has been completed recently or some data is concerning the property for which the data is requested has been previously available, this data will be added to the order request such that certain portions of the order to be filled in by the searcher are already filled in, subject to amendment by the searcher.

The next three components are the internet 148, the mobile device 150 and property data sources 151. In the preferred embodiment of the invention, the internet 148 is used to transmit data to and from the mobile device. In alternative embodiments, proprietary networks or other means of transmission to and from the mobile device may be used. In the preferred embodiment, the mobile device is connected to the internet persistently via a wireless internet access card. In the preferred embodiment, this card is a network access card which uses cell phone connectivity technology. In alternative and future embodiments, this may be another version of wireless internet access, such as an extension of the 802.11a-g protocols or successor standard protocols. In alternative embodiments, the mobile device 150 may be connected or "synced" at the end of the day via a hardwire or wired network connection using a home or other computer system.

In the preferred embodiment, the mobile device 150 is a tablet pc equipped with an always-on cell phone connectivity wireless air card. In alternative embodiments, the mobile device 150 may be a regular notebook personal computer, a handheld personal computing device, such as a Palm® or PocketPC® device. Alternatively, the device may even be a wireless-enabled cell phone or smart phone. In other embodiments, the mobile device 150 may be a custom device containing at least the ability to wirelessly connect or to repeatedly via wired connection interact with the internet 148 and which is capable of utilization by the searcher to fill in forms or to update data on the internal servers. The forms may be filled in or updated using a tablet pen, a keyboard, a voice recognition system, an electronic gathering system, as well as other devices or systems. Finally, the property data sources 151 are the numerous sources from which property data is gathered based upon the order forwarded to the mobile device upon order download request. These sources can include, but are not limited to: county title offices, county tax assessor's offices, public utilities offices, county abstract offices or other sources of property data as requested by the order.

Figure 3:
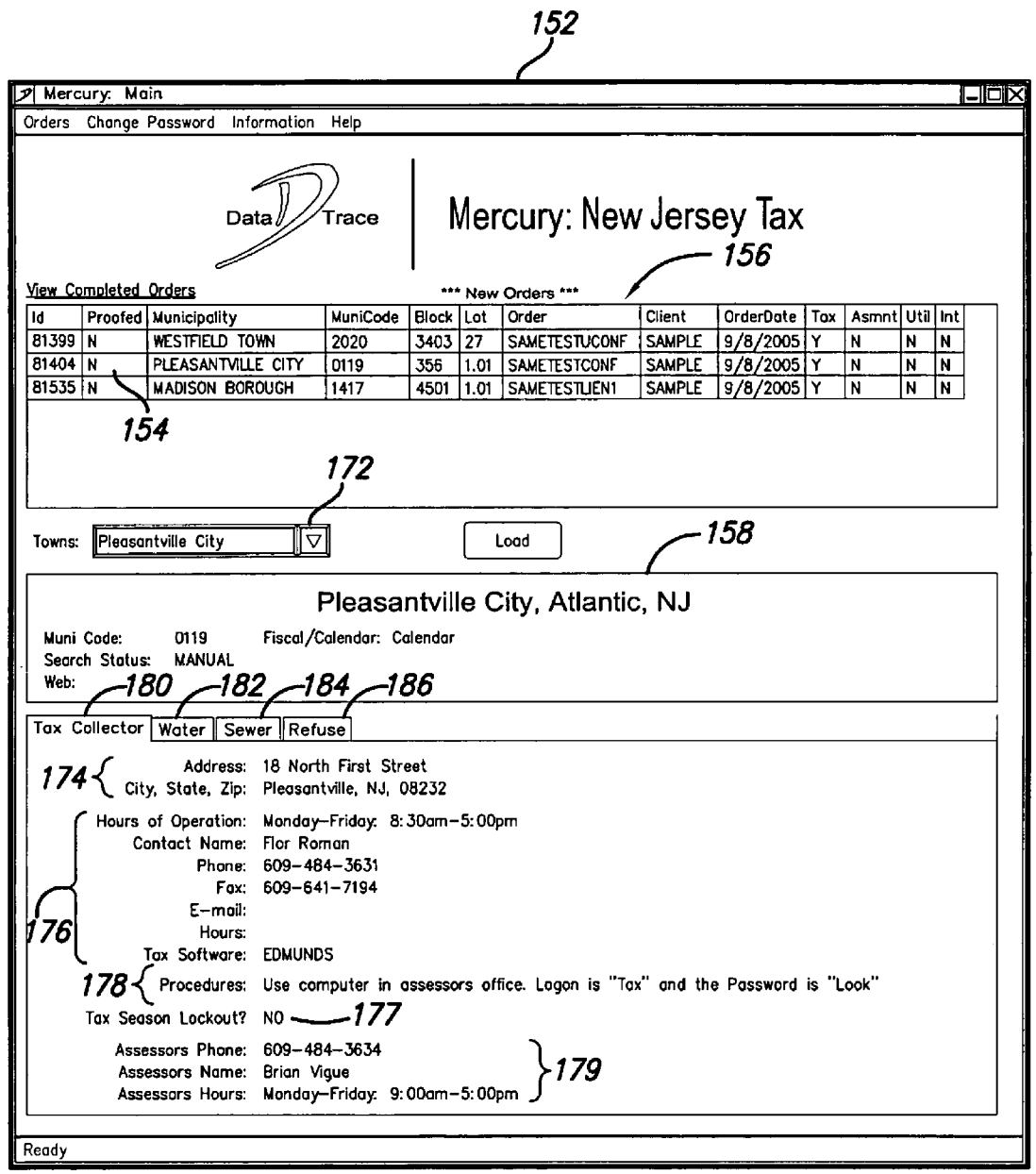
FIG. 3 is a depiction of an example order queue window and an example city information window.

Referring now to FIG. 3, an example new order queue is depicted as it is seen from the mobile device 150. In the preferred embodiment, the order queue that is received by the mobile device 150 is viewed via a client server application which resides on the searcher's tablet 152. This is good for numerous reasons, most notably, that the orders can be worked on by the searchers offline, without having the need to connect to the Internet. The use of web-based applications is well-known in the art and its other benefits are also well-known. Depicted in element 154 is the city of Pleasantville City in Atlantic, N.J. Clicking on an order in the order grid 156 provides a screen or window 158 that displays information about the tax collector, water, sewer and refuse for the city or town desired.

Also depicted in FIG. 3 are the orders pending for Westfield Town and Madison Borough. These are depicted in element 156. Similarly to Pleasantville City depicted above, information about these areas may be seen by clicking on an order in the order grid depicted in element 156. These help an individual searcher to perform their job searching for these titles and tax records more quickly and efficiently.

An example of the information about the tax collector is shown in FIG. 3. This information changes whenever an order is clicked once in the order grid 156. Furthermore, if the user of the mobile device selects a specific city (or town) from the dropdown box 172, the city (or town) information reflects the selected city (or town). This figure depicts data that may be relevant to a searcher who will be performing a job in the town/state or county. As can be seen in element 158, this section refers to Pleasantville City, Atlantic, N.J. Various information for relevant county or city facilities are depicted. For example, the tax collector and water department are depicted in elements 180 and 182, respectively. So, for the tax collector 180, the address is depicted in element 174, to aid the searcher in finding the proper office in which to search for tax data. Additionally, the hours of operation and contact information for the office is shown in element 176. Procedures are depicted in element 178, for example, the tax collector prefers that requests for information on a property be submitted using a computer in the assessors office where the logon is "Tax" and the password is "Look". For the tax office, which is very busy around tax time, there is a tax lockout, as shown in element 177. Also depicted in element 179 is the tax assessor's name, phone number and hours. Similar groupings of data are depicted on the folder tabs such as water, sewer and refuse depicted in elements 182, 184 and 186.

Referring now to FIGS. 4a-4f, example order forms, as seen on the mobile device, are depicted. These order forms can be a stand alone or web-enabled application. The due date for the order request is depicted in element 192, the order number is shown in element 194. The date on which the order was placed is shown in element 196. The first major block of information is the physical information about the property, as shown in element 198. For example, the owner's name is requested in element 200 and the mailing address for the owner is requested in element 202. To the extent this data is available before the searcher receives the order, it will be filled in by the processing server. Finally, a button is included at the end of this and every section for completion of that section. This button is shown in element 204 as "Done." This button will make sure that valid responses are made in each required portion of the form. This performs very basic error checking such as ensuring various fields have numbers only, or that various values add up to a predetermined sum amount.

The next sections, depicted in elements 206 and 207, are devoted to the land value, improvement value, abatement, total value, and amount of taxes billed, paid and owed on the property in the last several quarters. These sections, as in other sections, has done and validation buttons, depicted as elements 208 and 209. The searcher will input the values from the tax assessor's office into the portions of this form which will then be validated before moving on to the next section. The next section is for assessments, as depicted in element 210. The searcher will look for tax assessments made against the property and input the value of any assessments and any comments in this section.

Element 212 depicts the utilities section. Here, the user of the mobile device inputs collected data pertaining to utilities for a property. This section, as in prior sections, has a Done button 214. This is used to ensure that the data has been input correctly, by ensuring various fields contain only numeric values, etc. Next, in element 216, a section devoted to liens is depicted. The user of the mobile device inputs data related to liens that may be on the property. Additional remarks may be made in this section. Any special information may be made in the section denoted by element 218. Any unconfirmed assessments may be made in the section denoted by element 220. Finally, the date the search was done, the searchers initials, and the searchers comments are input by the searcher in boxes or elements 222, 224, and 225, respectively. The searchers comments allow the searcher to communication about the order back to the proofer.

Once the user is done inputting the data, there are three options. One, the user may submit the document 226, at which point the web form attempts to submit the data using the web. Alternatively, if an internet connection is not available, the submit button 226 saves the data for a later attempt to be submitted when an internet connection is available. Alternatively, the user may cancel the submission by clicking the button available in element 228. Finally, the user may click the hold button in element 230 to save the data temporarily for later submission. It is to be understood that the display and web forms depicted in FIGS. 4a-4f are only examples. Differing web-pages may be used with only some or one of the sections depicted in FIGS. 4a-4f. In the preferred embodiment of the invention, only sections for which information was requested by the order are shown to the searcher. So, for example, if the search order request did not wish to see data about utilities 212, that entire section will be left out of the example order form. Alternatively, a web-enabled application designed to run on the mobile device or a different web-form may be used to fill the order requests. Any application or hard-coded device capable of quickly collecting this data from the field and forwarding the data on to be proofed, saved and completed may be used.

When an order is submitted, data is drawn from numerous sources in order to create that order. As seen in FIG. 3, for example, data pertaining to the various offices in which data may be gathered is included, for the benefit of the remote user, in the order request. This type of data comes from a file server with a series of XML files. Within the order creation system is the database with the series of tables. Tables are locations from which data may be drawn.

In one embodiment, the order may be submitted for proofing. The proofer can reject the order and give one or more reasons for the rejection. When the searcher receives the rejected order, the searcher can view in a special instructions window 231 the proofer's comments as to why the order was rejected. For example, "Please fill in the entire utility section." The special instructions window 231 may also include a Client Note from the client that ordered the search. The Client Note is a note from the client indicating what the client would like for the order that he/she requests. The special instructions window 231 may also show the searcher whether the search is an Amended Search (i.e., a search that was already sent to the client or customer but needs further information and will be resent once that information is collected). The special instructions window 231 may also show the searcher Interest Details. The Interest Details may include whether or not to collect interest, if interest is to be collected, the dates on which the interest should be collected, etc. The special instructions window 231 provides information to the searcher regarding how to fill out the order, collect information, etc. The searcher can also attach his or her own comments in box 225 to the order for the proofer to read. This provides one way the searcher and the proofer can communicate.

Figure 6:
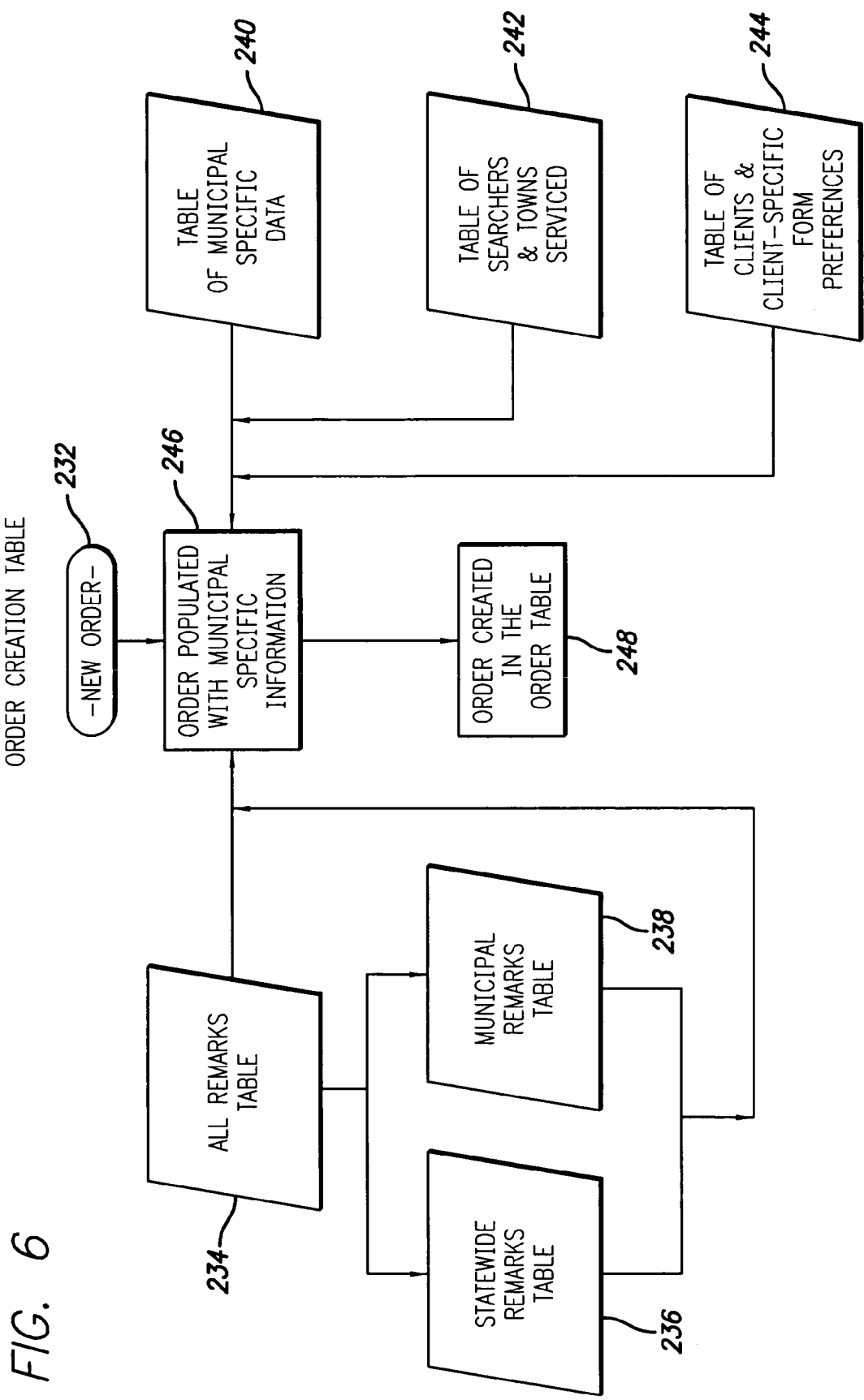
FIG. 6 is a flowchart depicting the order creation tables.

So, referring now to FIG. 6, a flowchart depicting the various XML files used in creating an order is depicted. So, for example, a new order 232 comes into the system via the website. Based on the location of that property, various data may be gathered.

So, data from element 234, the all remarks table, is added. This data may be stored locally on every mobile user's unit. Each time an order is loaded on the mobile device, the file store is queried for the latest information and it is incorporated into the form. The data in the XML files is data such as contact information for the office in order to correct errors in the order. This also typically includes the overall format of the form (in the preferred embodiment) as depicted in FIG. 5. To populate this data table, for each order, additional data is requested from the statewide remarks XML file 236 and the municipal remarks XML file 238. These two XML files contain state and municipal specific remarks for the day or hour or week. This can include information such as a new utility company that stores utility information for a specific town. Next, in element 240, the XML file with municipal specific data is depicted. This XML file contains municipal specific data that is included, such as local municipal contact data for each office to be contacted for gathering all or a portion of the information requested in the order. The table of searchers and towns serviced, in element 242 is also used in the preferred embodiment, to determine to whom this order will go for searching. This table contains data such as which searcher has which mobile device and which municipalities are serviced by a particular searcher and mobile device. Therefore, when the order is created, the search request will go to the proper searcher for quick completion. The system and method can reassign orders or towns between searchers. For example, if a searcher is ill, his or her order can be redirected to another available searcher. This redirection operates seamlessly with the mobile device and can work in cooperation with a web-based order management system.

Finally, the XML file of clients and client specific form preferences file 244 is used to provide the user of the mobile device with client specific information such as what to collect along with each orders. This is all handled when each order is already on the mobile device and the order is loaded up by the user of the mobile device. The final step is to put the completed order in the order table, or queue, for pickup by the searchers upon connection to the system.

Figure 7:
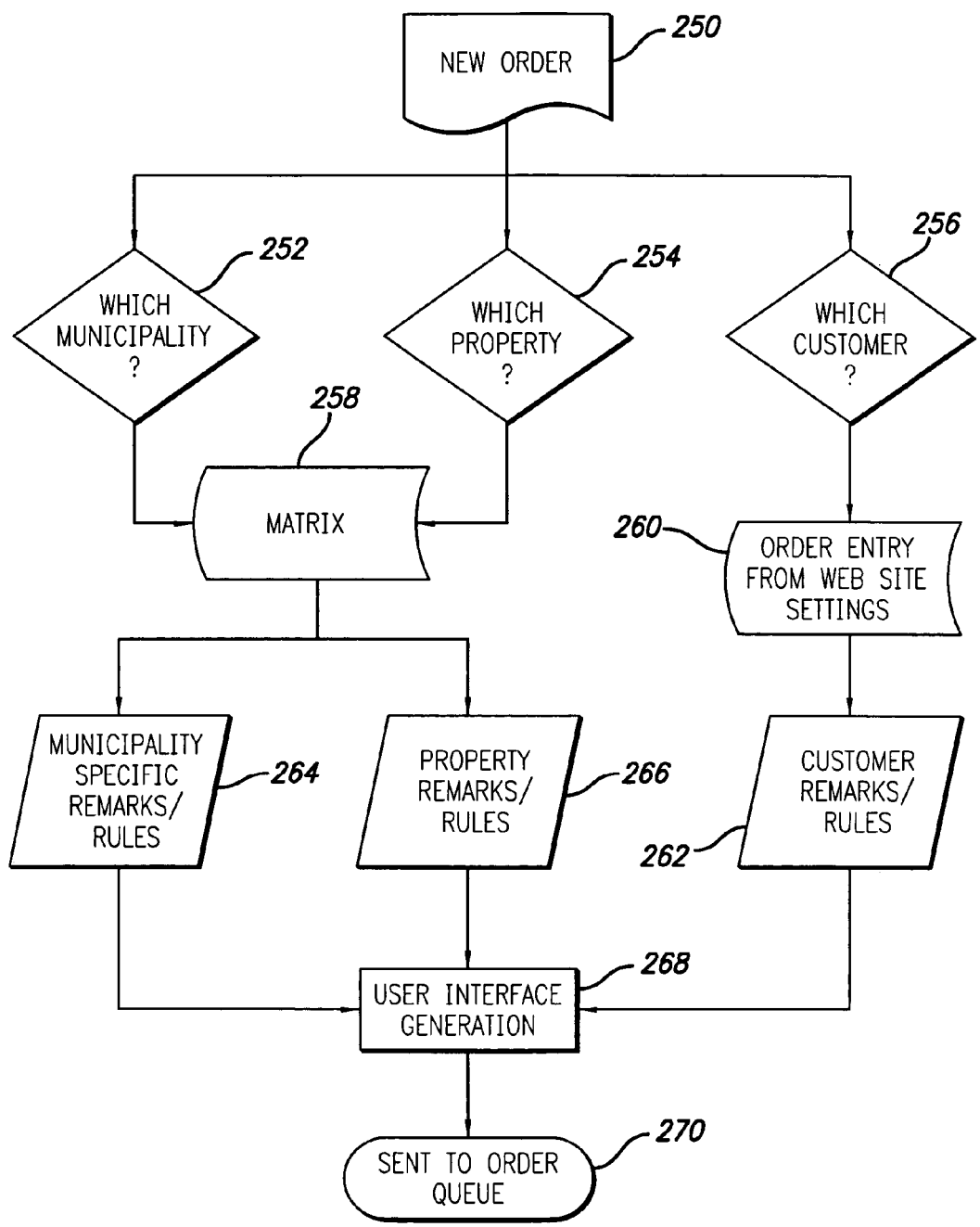
FIG. 7 is a flowchart depicting the dynamic generation of a user interface.

Referring next to FIG. 7, a depiction of the user-interface generation internal to the method of this invention is depicted. This process is used to create the user interface, such as that depicted in FIGS. 3 through 5b. The user interface is customized to the property, the customer requesting the property information and the location of the property, based on data contained within various database tables and XML files, as shown in FIG. 6. So, to generate the user interface that the mobile user will see, the first step is the new order being submitted in element 250 and downloaded by the mobile user to the tablet. Once the order is downloaded and then loaded up by the mobile user on the mobile device, the user interface generation process asks which municipality 252, which property 254, what was ordered, and which customer 256. Each of these four questions help to determine the user interface that is presented to the mobile user. The questions which municipality and which property combine to create a matrix 258, which is used to select the specific details which are displayed. For example, for one municipality and property there may only be one office from which all information may be gathered, therefore, only one contact information is displayed for that "matrix." However, in alternative municipality and property combinations, contact information for several offices may be needed. For example, there may be separate offices for tax and title information, where the information for each office needed to fill the order would be provided in the order request to be picked up by the mobile device from the order queue. All relevant information for various offices will be displayed in the order request once it is downloaded by the mobile device. In that case, the matrix yields a different user interface.

Next, the "what was ordered?" question is answered in conjunction with the "which customer?" 256 question and the order entry from the web site settings 260. These order entries from the web site settings are settings inputted by the individual placing the order request. These settings may alter the required data, such as not requiring assessment data about a property or not requiring utilities data for a property. Also included in this step are customer remarks and rules 262. These remarks and rules may be specific, such as a request to get only assessment data for a particular period of time. Once the matrix 258 of municipality and property determines what applies to the order], the municipality-specific remarks and rules 264 are added along with property remarks and rules 266. These rules may be related to the data that may be gathered in a particular municipality or property, such as what data is available. If certain data is unable to be found, the user interface removes input blocks or requests for that data. Finally, the user interface is generated 268, using all of these matrices and data. Once the user interface is created, the order is loaded on the screen for the tablet searcher to input all information.

Figure 8:
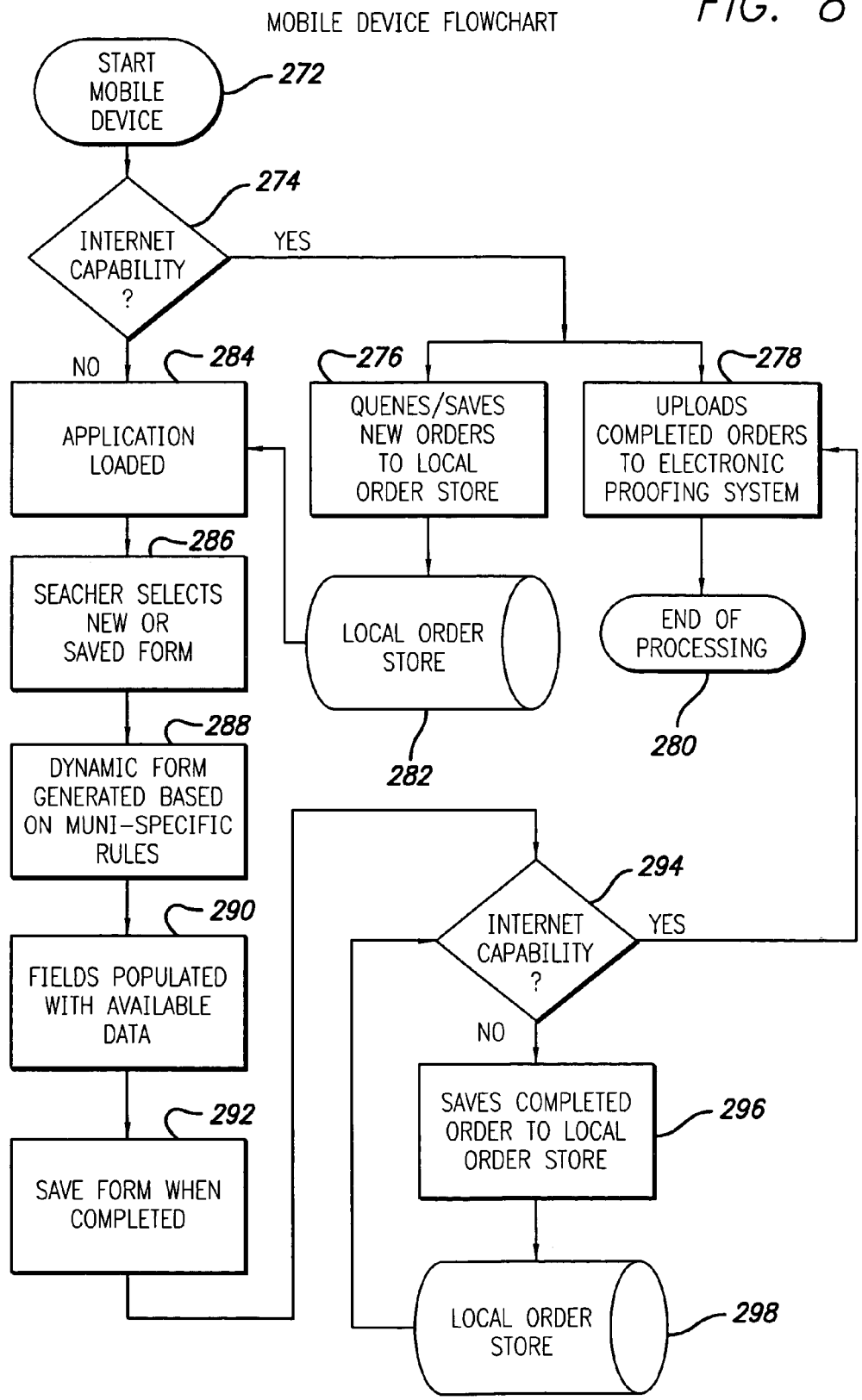
FIG. 8 is a depiction of an example mobile device flowchart.

Referring now to FIG. 8, an example mobile device flowchart, depicting the steps taken on the mobile device of the preferred embodiment. In the first step, the mobile device is started up 272. In the preferred embodiment, this is turning on the tablet personal computer. In alternative embodiments, the device may be "always on" or may only require that the "internet" be enabled by enabling or inserting a network device. The next portion of this flowchart is a decision tree to determine whether there is internet capability 274. This box is used to determine if the mobile device is capable of using the internet to contact the order queue and databases. If there is internet connectivity, then the mobile device with query and save new orders to the local order store 276. The local order store 282 is a database local to the mobile device, for storing the orders designated for a particular device. The step depicted in element 276 involves contacting the web server in order to receive the orders from the order queue in the processing server 140 in FIG. 2. The orders that are for the particular mobile device will be flagged, in the preferred embodiment with a unique identification number, and only those order requests will be picked up by the mobile device and added to the local order store 282.

The mobile device also uploads completed orders to the electronic proofing system 278 to be proofed. These orders are orders that have previously been completed. Once these orders enter the proofing stage, this is the end of mobile device processing 280, unless the order is returned to the searcher via being rejected by proofing. This process can occur in real-time as the individual is using the mobile device. So, for example, as the mobile device is used to complete one order, another order for data from that same property data source may enter the order queue. Once the order being done is completed, it will immediately be uploaded for proofing 278, while the device simultaneously downloads new orders including the order for data from the same property data source. One of those new orders may be for the property data source in which the user is working, in which case, it may be completed before the mobile device operator moves to a different office. This instant-update connectivity is much more efficient than the prior art facsimile order requests and enables the user to work faster on all current jobs.

If there is no internet capability 274 or the orders have been stored to the local order store 282, the application is loaded 284 on the mobile device. This application may be the only built-in application or may be one of many, if the mobile device is a tablet pc, as in the preferred embodiment. If there are any jobs in the local store, with or without internet capability, the searcher (mobile device operator) then selects a new or saved form 286. These forms are the forms for each order in the local order store 282. The form is dynamically generated, previously in the preferred embodiment, based on the municipal-specific rules 288. If work has been previously done or the order has been partially filled, this form will have been saved in its partially-completed state. Any available fields have been or are populated with available data 290. This step is the step in which the searcher actually requests data from a property data source and inputs the response data into the mobile device. Available data is then stored, using the temporary storage function shown in element 230 of FIG. 5b. If the searcher needs to move to a different office to receive additional data, this "hold" button 230, in FIG. 5b, will hold the data already input until the searcher arrives at the other property data source. This "hold" button 230 saves the state of all form data, so that the remaining data may be filled-in once the searcher arrives at the next property data source.

Once all available data has been gathered, the form is saved when completed 292. The device then determines if there is internet capability again, in element 294. If so, the completed order(s) are uploaded to the electronic proofing system 278 which ends the mobile device's processing 280. If there is no internet capability 296, then the mobile device saves completed orders to the local order store 296. The local order store is depicted in 298, but is the same local order store depicted in element 282. The mobile device then periodically checks to determine if there is internet capability 294 so that it may upload the completed orders to the electronic proofing system 278 and end the mobile device processing 280.

Referring now to FIG. 9, an example matrix field is depicted. Matrix fields and the rules contained within them are applied prior to an order being uploaded to the order queue. For example, in FIG. 9, element 300, the matrix field being applied is used to determine, before an order is sent to the order queue, whether a particular municipality is capable of automated order queuing and searching. In some municipalities, automation may be unavailable, though, in the preferred embodiment, automation is available in all municipalities. The matrix then determines if a rule should be applied in element 302. The response in element 302 is "yes." Therefore, in element 304, if automation is available, it is used by the preferred method of this invention. This means that the order would then be queued up in the order queue.

Referring now to FIG. 10, an additional example matrix field is depicted. This matrix field I used to determine if Bankruptcy Billing that requires research is present for this property 306. If the property has bankruptcy billing that requires filed research 308, then a rule is applied to the data. The rule that is required is shown in element 310, it is to send the order to the mobile device for manual research. This means that the searcher's screen will have a special section for additional bankruptcy billing research that must be done by the searcher in order to complete the order.

Figure 11:
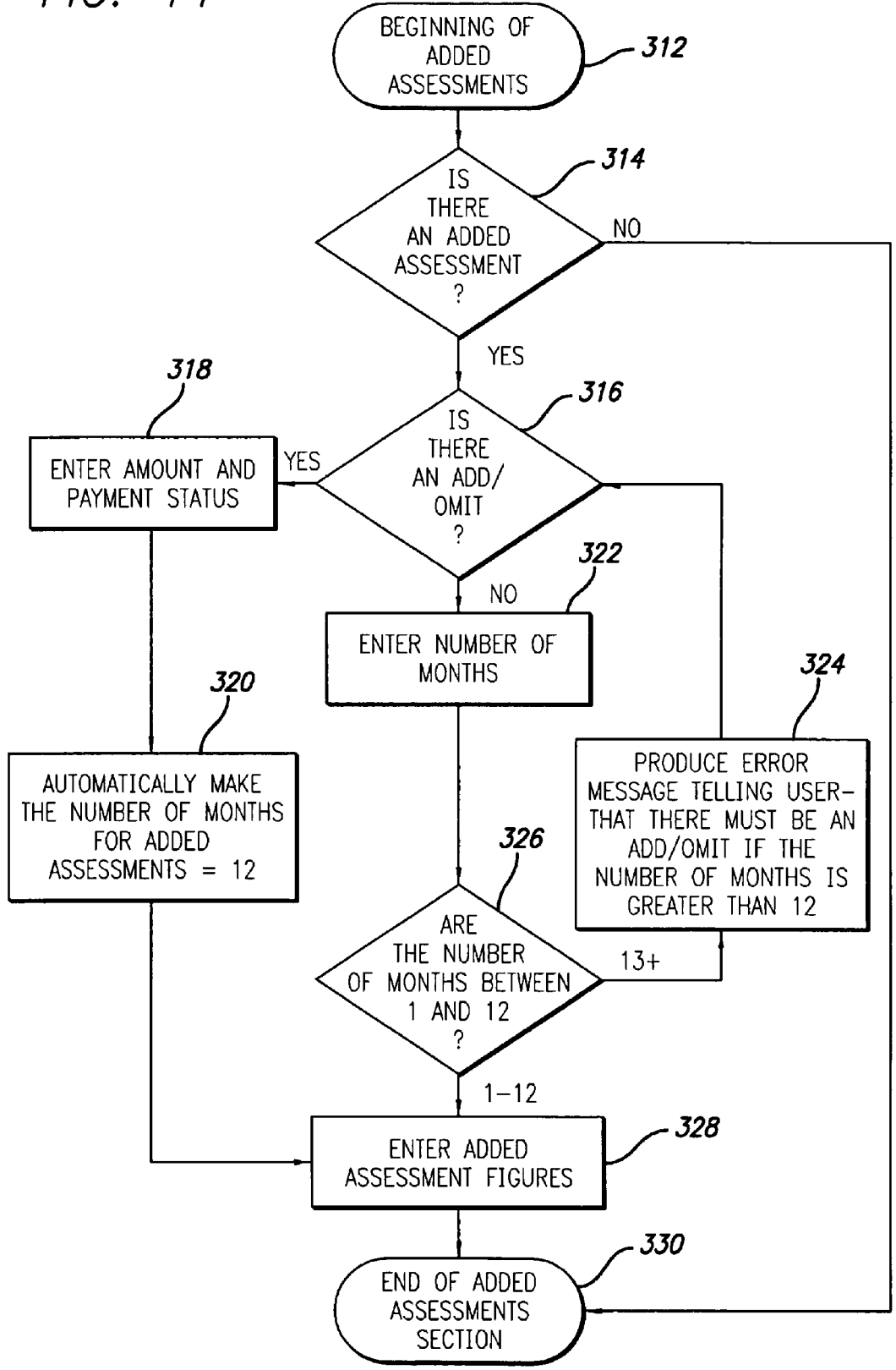
FIG. 11 depicts a flowchart of the assessment data input process for the searcher.

Referring now to FIGS. 5a and 11, the input of assessment data is depicted. First, in element 210, the section of the input mechanism for the searcher that is used for inputting assessment data is depicted. This section begins with only a single forth quarter being required. The process depicted in FIG. 11 may dynamically add additional input blanks to the web application shown in FIGS. 5a and 5b. So, at the beginning of added assessments 312, the searcher may input the added assessment 314, if one exists. If there are none, then this is the end of the added assessments section 330. If there are added assessments, then the searcher must determine if the searcher wants to add/omit assessments 316. This means that the searcher may add additional quarters of assessments or remove prior one's that they have added. If the answer is yes, then the searcher enters the amounts and payment statuses for all relevant assessment periods 318 and the number of months is automatically made into twelve 320. If the answer is no, then the searcher inputs the number of months 322. If the number of months are not between 1 and 12, then there is an error and the searcher is prompted telling them that there must be an add/omit if the number of months is greater than 12, depicted in element 324, and returns to element 316. Alternatively, if the number of months is between 1 and 12, then the added assessment figures are entered 328 and this is the end of the added assessments section 330.

Figure 12A:
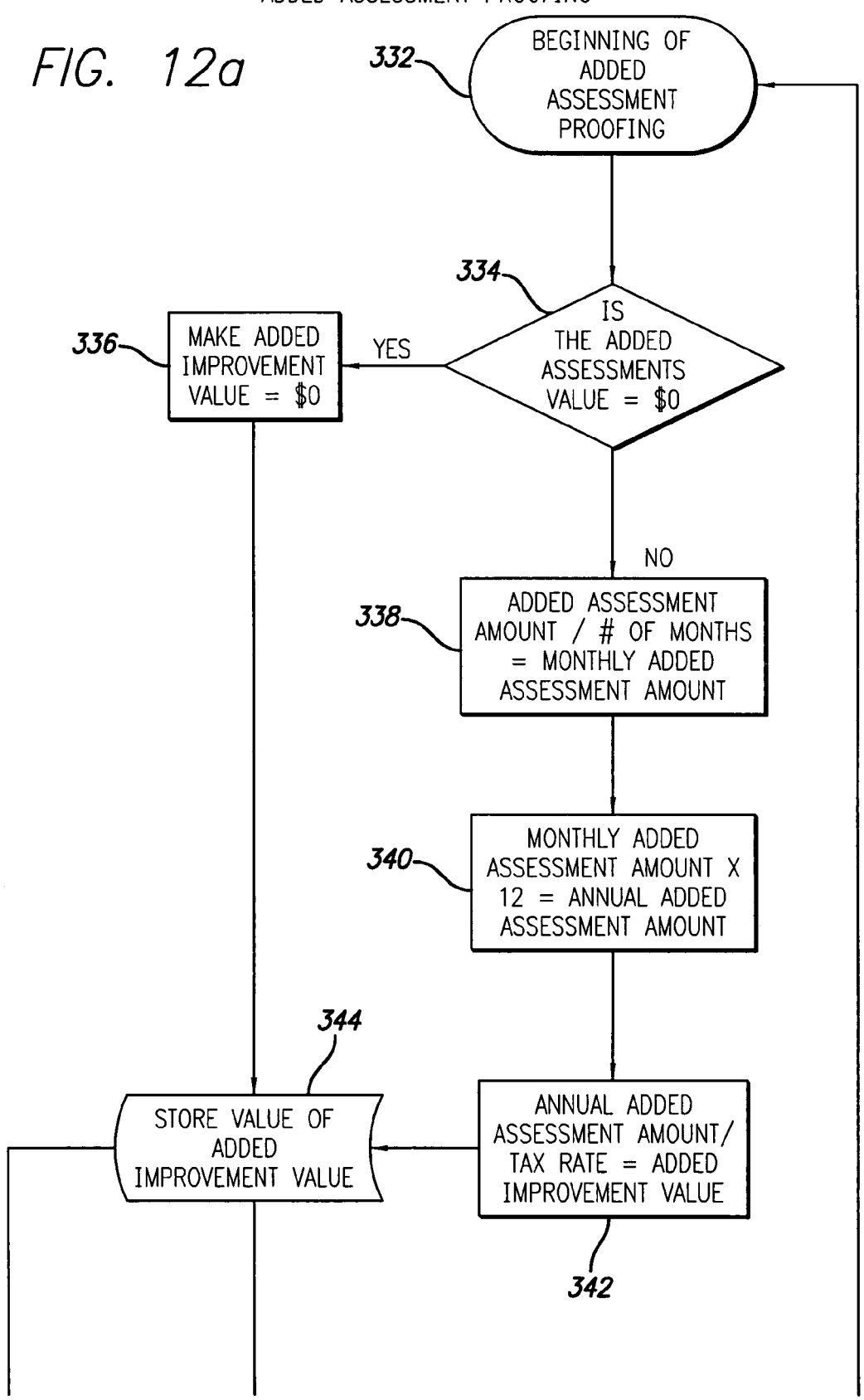
FIGS. 12a and 12b depict an automated proofing of the assessment data.
Figure 12B:
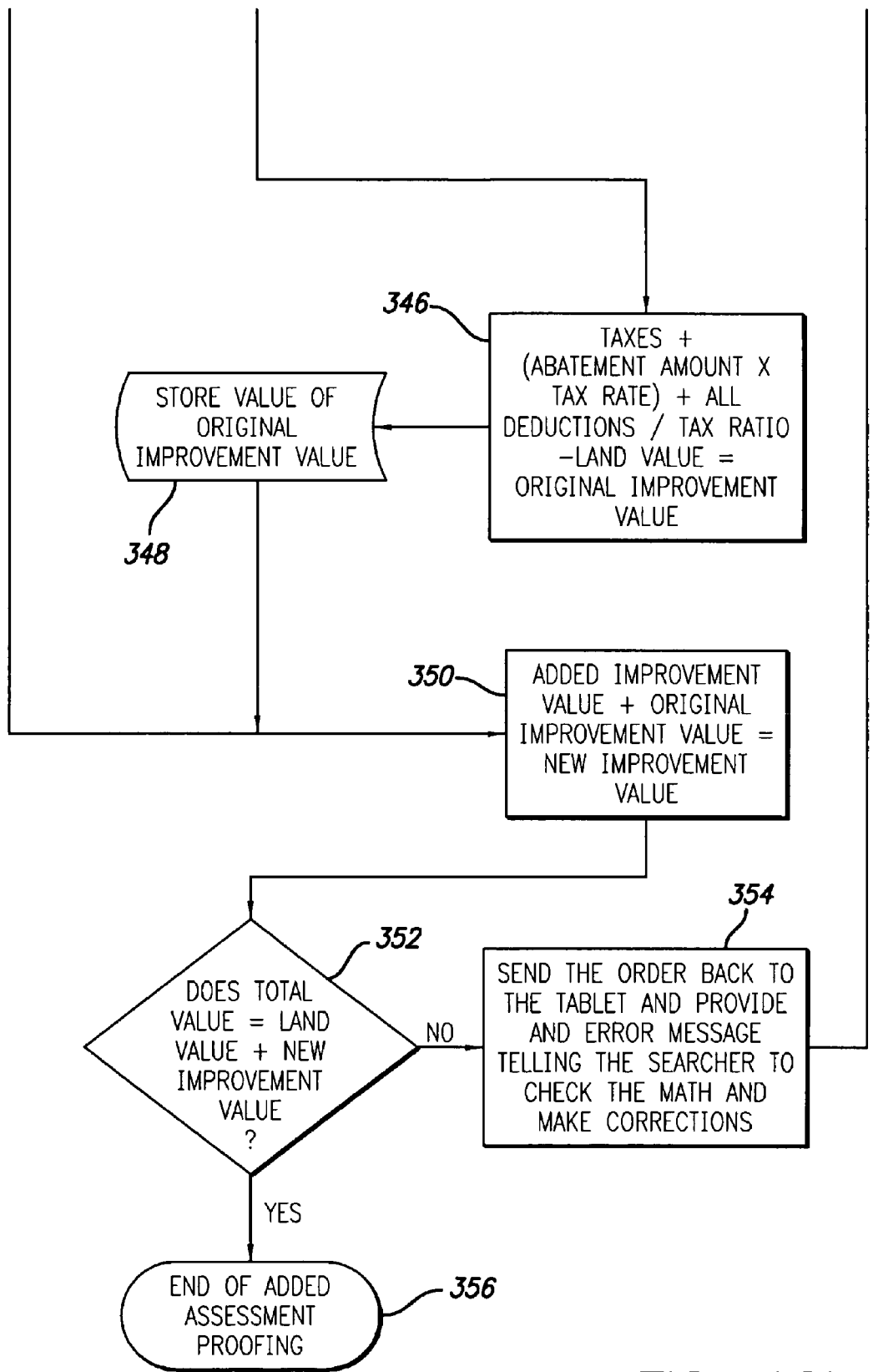

Next, depicted in FIGS. 12a and 12b is an added assessment proofing flowchart. This is an example of a portion of the proofing process that takes place before the order is finalized and sent to the requester. This step takes place as the assessment data is received from the searcher. In this exemplary portion of the proofing process, the first step is to begin the process of added assessment proofing 332. In the next several steps, mathematical calculations are used to verify the added assessment values. First, is the added assessments value equal to $0, as requested in element 334. If yes, then the added improvement value is set to $0, as shown in element 336, and the added improvement value is stored 344. If the added assessments value is not $0, as requested in element 334, then the monthly added assessment amount is set to equal the added assessment amount divided by the number of months 338. Next, the monthly added assessment amount is multiplied by 12 which is then saved as annual added assessment amount 340. Next, the annual added assessment amount is divided by the tax rate to reach the added improvement value 342. This value is stored as the added improvement value in element 344.

Next, the most recent taxes are added to the abatement amount times the tax rate which are then added to all deductions. This value is then divided by the tax rate. Finally the land value is subtracted and this yields the original improvement value 346. This value is stored in element 348. Next, the added improvement value is added to the original improvement value to equal the new improvement value 350. The proofing test comes next. Does the total value equal the land value plus the new improvement value, as shown in element 352? If not, then the order is incorrect and the order is returned to the searcher to make corrections 354. If it is correct, then this is the end of added assessment proofing 356.

Additional rule-sets and proofing can take place for each portion of data that is delivered by the searcher. Additional proofing is performed in the preferred embodiment to ensure that tax calculations are performed correctly, that if certain boxes are checked "yes" then the data pertaining to those boxes is also filled in, or determining if the value of the land as input makes sense in light of other input data. These and other validations are completed during the proofing process of the preferred embodiment. Once the proofing process is completed, the property data is stored to the property data database 146 (see FIG. 2) and is then returned to the property data requester.

The preferred method of this invention provides for numerous reports and tables to be generated from data that may be gathered using this invention. These reports and tables may be used to further refine the process or to monitor the success and efficiency of particular searchers or counties. Additionally, the reports may be used to determine which areas are capable of using all or portions of the method of this invention at any given time.

Referring now to FIG. 13, a turnaround time report is depicted. This report is useful for determining the percentages of completed orders that are taking place over given time-periods. A date range is depicted in element 358. This range may be set for any period of time over which orders are received and outstanding. There is also a location depicted in element 360. In this example All New Jersey Municipalities is depicted. This may also be changed to any section or subsection from which orders are being requested and received. The example table depicted shows that a particular municipality 362 is in the left-hand column. The first municipality is Absecon, as shown in element 364. For each municipality, cumulative percentages and actual numbers of completed orders are given as seen in elements 366 and 368 where 6 completed orders and 60.00% of outstanding orders are delivered, respectively within 3 hours.

At the bottom of this chart, the totals 370 are given for all municipalities. In the example chart, only two municipalities are depicted, but in the preferred embodiment, multiple municipalities will be shown. The total completed orders in hour 6 after their request was 10, as shown in element 372 and the total completed ordered is 31 (6+15+10). The total cumulative percentage in hour six after request is 77.50%, as seen in element 374. After 2 days, 90.00% of orders are completed, as seen in element 376. This report may be used to determine the length of time needed in individual municipalities and overall to complete orders using the method of this invention.

Referring next to FIG. 14, a tablet order tracking summary is depicted. This table order tracking summary is useful as a quick-glance reference for the status of a given remote device. In this example report, the searcher Sam Smith, shown in element 386 is shown. Sam Smith has been assigned the remote device (in this case a tablet pc) numbered 0001, as shown in element 388. Contact information for Sam Smith is also shown in element 390, such as cell, home and fax numbers. The report is useful for determining how active a searcher or device has been recently. So, for example in element 392, it can be seen that the territory (typically municipality, but may be smaller or larger) is 16. The total number of orders in the system, as seen in element 394, is 24. Therefore, the percentage of orders in the queue versus those in the system is 66.6% (16/24) as shown in element 396. The discrepancy occurs then the remote device has not recently downloaded new orders and uploaded completed orders. The last download time and elapsed time since last download of new orders can be seen in element 398. The last upload time and elapsed time since last upload may be seen in element 400. This report may be useful in tracking overall order progress, total orders and download/upload activity assigned to a searcher.

Referring now to FIG. 15, a tablet order tracking detail is depicted. In this view, the reviewer can see the individual orders that are outstanding and completed for a searcher and receive a more detailed view of their status. This example again uses Sam Smith, as shown in element 402. Sam is still using Tablet #: 0001, as shown in element 404. The order number NAM-04-2019 is shown in the row denoted by element 406. This order was downloaded at 09:05 AM, as seen in element 408 and was completed, as seen in element 410, at 12:15 PM, as shown in element 412. The total elapsed time is shown in element 414 as 3H, 10M or three hours, ten minutes. However, order number NAM-05-3342, as shown in the row depicted in element 416 is still outstanding, as seen in element 418. The total elapsed time, shown in element 420, is currently 4H, 45M or four hours, forty-five minutes on this order and it is not yet complete.

Referring now to FIG. 16, an order volume report is depicted. This report shows the volume of orders for each municipality. The example report depicted shows only three municipalities, but in the preferred embodiment, all cities in a given area will be displayed. The first element, element 422, shows the date range on the volume report. This may be set to any range so as to get a short-time-frame understanding of the volume of orders or a long-time-frame understanding. Element 424 depicts Absecon City and shows that for the date range given, there were 25 orders, shown in element 426. Next, Brigantine City is depicted in element 428. For this city, there were 13 orders, shown in element 430, for the date range selected. In total, for these three cities shown, the number of orders was 128, as shown in element 432.

This report may be used to determine if a given municipality needs additional searchers in order to handle the total number of orders. Alternatively, it may be used to move searchers from place to place given an unusually high influx of orders for a particular municipality or a particularly low number of orders in another. Additionally, the report may be used, given specific date ranges, to determine when large volumes of order requests are coming in or when small volumes are being requested. It is also useful for comparing total order requests across municipalities.

Referring next to FIG. 17, a rejected during order processing detail report is shown. This report details all the rejected orders during processing before the orders are sent to the remote device for completion. The first order, numbered NAM-04-2019 in this example, denoted by element 434 was rejected because no match in property master file 436. This means that the property for which a title/tax search was requested could not be found. The second example rejected order, order number NAM-05-2254 in element 438 is rejected because no match was found in the property data database 440. This means that the property was found in the property master file, but was unable to be found also in the property data database. The likely reason these properties were not found is that they were input incorrectly by the order requester.

Referring now to FIG. 18, a summary report of the type of data displayed in FIG. 17 is shown. In this summary report, the data range is one month from Jun. 1, 2005 to Jul. 1, 2005, as shown in element 442. The summary report also shows the total number rejected due to the failure to find them in the property master file within the property database. The total number rejected for this reason is 125, as shown in element 444. Next, the total rejected due to no match being found in the property data database is shown as 63 in element 446. Finally, the total number of orders rejected due to a different owner's name being on the property was 7, as seen in element 448. The total number of rejections may be seen in this report as 195, in element 450.

Referring next to FIGS. 20 and 21, similar reports are depicted for orders rejected during proofing, both detail and summary, respectively. In FIG. 19, the date range is again depicted in element 452. It may be changed to suit the needs of the reviewer from a very short period of time to a very long period. The order number NAM-04-2019 is shown in element 454. It has been rejected during proofing for the reason shown in element 456, the searcher failed to input a water comment. The order shown in element 458, numbered NAM-05-2254 was rejected during proofing because there was a math error in the taxes section of the order, as shown in element 460. Referring now to FIG. 21, the same date range is shown in element 462, for this summary report. The total number of rejections during proofing given for each type of rejection is shown in this report without regard to the individual order numbers or clients or the municipality in which the order was filled. So, for example, the total number of orders rejected for missing water comments was 6, as shown in element 464. The total number of proofing rejections due to math errors in the taxes section was 13, as seen in element 466. In this example only a few errors are shown, but in the preferred embodiment, numerous types of errors may be present all of them subdivided by the type of error. Finally, the total proofing rejections is shown in element 468 as 19. This report can be used to determine the accuracy of data gathered and where there may be potential errors, such as math errors in taxes which need refinement or additional training for searchers to gather the information.

Finally, referring to FIGS. 21a and 21b an order life-cycle report is shown. This report is very useful for tracking the entire life of an order and the time it takes to complete a single order and orders on average. The order life-cycle report shown in FIGS. 21a and 21b is abbreviated so that it may be more easily understood for exemplary purposes. An actual order life-cycle report, depending on the length of time and number of searchers reported may be very long or very short. In element 492 the date rage from Aug. 17, 2005 to Aug. 22, 2005 is shown. This is a relatively short time-period accounting for orders received and completed between those two dates. The search is further limited by element 494, the individual searcher, in this case Linda Loving. Therefore, this order life-cycle report is for a short time-frame for a single searcher, Linda Loving. Alternative embodiments of an order life-cycle report could be made for much longer periods of time, such as entire months, fiscal quarters or years, and could be for single or groups of searchers based upon any number of division criteria.

The preferred embodiment of the order life-cycle report may only be created using the method of this invention or one significantly similar. A computer tracking each input-time and proof-time and completion time for each step is able to accurately determine the times at which these events occur. The columns depicted in the preferred embodiment of the order life-cycle report are time ordered 496, time order downloaded by searcher 498, time order uploaded from searcher 500, the time order proofed by proofer 502, time order was completed for customer 504 and total turnaround time 506. All of these columns will be described in the following paragraphs.

For the order depicted in element 508, order number 1942658-T, received on Aug. 18, 2005, the time the order was received was 10:44:48 AM, as seen in element 510. The time ordered is the exact time-stamp from the website, fax or phone call received in which the order was passed into the system. Next, the time the order was downloaded by the searcher was 12:10:46 PM, as seen in element 512. This is the time it took for the searcher to connect, after the order was created, and to download the order request to his or her mobile device. As also seen in element 512, the elapsed task time and cumulative elapsed time are both 1 hour, 26 minutes. These two numbers are spread throughout the order life-cycle report in order to see how long each step and the total transaction is taking at any point along the way.

Next, the time the order was uploaded from the searcher is shown as 04:09:27 PM in element 514. Also shown in element 514 are the elapsed task time of 3 hours, 59 minutes and the cumulative elapsed time of 5 hours, 25 minutes. So, this portion of the task, between downloading the order and uploading the completed order took 3 hours, 59 minutes. This information can be used to optimize the process and to determine which searchers and locations take the longest to complete orders. Additionally, it may be used to determine when additional searcher are needed and to give accurate estimates of the time required to complete an order. Next, the time order proofed by proofer is shown as being completed at 04:11:46 PM in element 516. The elapsed task time is 0 hours, 2 minutes and the cumulative elapsed time is 5 hours, 27 minutes in element 516. The next section is for the time the order was completed for the customer. The time the order was completed for the customer was 4:11:46 PM a cumulative elapsed time of 5 hours, 27 minutes after the order was placed. This number is also shown in element 520 under total turnaround time.

In addition to the individual order-by-order listing in the order life-cycle report, the average elapsed time 522 and the average cumulative time 524 are also shown at the bottom of any order life-cycle report. So, for the time order downloaded by searcher column, there is an average elapsed time of 13 hours, 12 minutes as seen in element 526. For the time the order uploaded from searcher, there is an average elapsed time of 20 hours, 41 minutes, as seen in element 528. For time the order was proofed by the proofer, there is an average elapsed time of 0 hours, 10 minutes as seen in element 530. Next, in element 532 the average elapsed time for the order to be completed for the customer is shown as 13 hours and 32 minutes. Therefore the average total turnaround time for each step is 13 hours and 32 minutes.

The next row shown in FIG. 21, is the Average Cumulative Time as shown in element 524. The average cumulative time to download the order by the searcher is 13 hours, 12 minutes, as seen in element 536. This row depicts the average cumulative time for every order. The average cumulative time to upload the order from the searcher is 1 day, 9 hours, 53 minutes as seen in element 538. The average cumulative time to proof the order by the proofer is 1 day, 10 hours, and 3 minutes as seen in element 540. The average cumulative time the order was completed for the customer, shown in element 542 is 1 day, 10 hours, 3 minutes. Therefore, the average cumulative total turnaround time for any order is 1 day, 10 hours, 3 minutes, as seen in element 544. Thus, for this searcher in this time-frame, the average total turnaround is roughly a day-and-a-half.

In describing preferred embodiments of the present invention illustrated in the drawings, specific terminology is employed for the sake of clarity. However, the present invention is not intended to be limited to the specific terminology so selected, and it is to be understood that each specific element includes all technical equivalents which operate in a similar manner. Furthermore, the inventors recognize that newly-developed technologies not now known may also be substituted for the described parts and still not depart from the scope of the invention.

Portions of the present invention may be conveniently implemented using one or more conventional general purpose or a specialized digital computer or microprocessors programmed according to the teachings of the present disclosure, as will be apparent to those skilled in the computer art. Appropriate software coding can readily be prepared by skilled programmers based upon the teachings of the present disclosure, as will be apparent to those skilled in the software art. All or portions of the invention may also be implemented by the preparation of application-specific integrated circuits or by interconnecting an appropriate network of conventional component circuits, as will be readily apparent to those skilled in the art based upon the present disclosure.

The present invention includes at least one computer program product which is in a storage medium (media) having instructions stored thereon/in which can be used to control, or cause, a computer to perform any of the processes of the present invention. The storage medium can include, but is not limited to, any type of disk including floppy disks, mini disks (MDs), optical discs, DVD, CD-ROMs, micro-drive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer-readable medium (media), the present invention includes software for controlling both the hardware of the general purpose/specialized computer or microprocessor, and for enabling the computer or microprocessor to interact with the human user or other mechanism utilizing the results of the present invention. Such software may include, but is not limited to, device drivers, operating systems, and user applications. Data used by the software may be retrieved from different sources (local or remote) and either permanently or temporarily stored (before, during or after processing) by utilizing any of the text files, delimited files, database(s), or other storage techniques. Ultimately, such computer-readable media further includes software for performing the present invention, as described above.

Included in the programming (software) of the general/specialized computer(s) or microprocessor(s) are software modules for implementing the teachings of the present invention, including, but not limited to, uploading property data requests to a database, using a mobile device to download those property data requests, inputting property data into the mobile device, uploading property data to another database, software used to review the property data for errors, and providing that property data to the customer. Obviously, numerous modifications and variations of the present invention are possible in light of the above teachings. It is therefore to be understood that within the scope of the appended claims, the invention may be practiced otherwise than as specifically described herein.

What is claimed is:

1. A computer-based method of gathering property data of a property having a location comprising the steps of:
   uploading a property data request to a first database;
   selecting, using a processor, a mobile device based on the location of the property;
   downloading the property data request from the first database to the mobile device;
   inputting property data received from various sources into the mobile device;
   receiving, at a second database, tax data or title data relatable to the property data;
   uploading the property data from the mobile device to the second database; and
   analyzing, using an electronic proofing system, the property data with the tax data or the title data for detecting an error in the property data.

2. The method of claim 1 further comprising the step of gathering information for the property data requests from in-house or 3rd party sources.

3. The method of claim 1 further comprising the step of storing the property data in a third computer database.

4. The method of claim 1 further comprising the step of delivering the property data to a requester.

5. The method of claim 1 wherein the downloading step takes place using a wireless or wired connection.

6. The method of claim 1 wherein the inputting the property data into the mobile phone is performed via an electronic form that is similar to a paper form.

7. The method of claim 1 wherein the mobile device is a personal digital assistant or a tablet pc.

8. The method of claim 1 further comprising the initial step of checking that the property for which the property data request was generated may be located within a property database.

9. The method of claim 8 further comprising a second step of checking that property data for the property for which the property data request has been made does not already exist within a property data database.

10. The method of claim 1 wherein the proofing step includes validation of the data for accuracy at a time before and after an order has been submitted.

11. A property data retrieval method comprising the steps of:
    submitting a request for property data to a server, wherein the property data is related to a property having a location;
    searching a database for the property data;
    generating a data request for the property data not found in the database;
    selecting, using a processor, a mobile device based on the location of the property;
    transferring the data request from the database to the mobile device;
    obtaining information requested in the data request;
    populating data fields with the information;
    determining, using an electronic proofing server, whether the information in the data fields contains an error by verifying the information in the data fields against a mathematical algorithm; and
    updating the database with the information from the data fields.

12. The property data retrieval method of claim 11 further comprising the step of sending a report to complete the request for property data.

13. The property data retrieval method of claim 11 wherein the data request is in the form of an electronic form.

14. The property data retrieval method of claim 13 wherein the data fields are embedded in the electronic form.

15. The property data retrieval method of claim 11 wherein the data fields are validated by the mobile device.

16. The property data retrieval method of claim 11 wherein validating is completed by a human proofer.

17. The property data retrieval method of claim 16 wherein the human proofer may add or edit the data fields.

18. The property data retrieval method of claim 11 wherein the mobile device is a personal data assistant or a tablet PC.

19. The property data retrieval method of claim 11 wherein the mathematical algorithm is based on a function of tax data or title data, and wherein the tax data or the title data is relatable to the property data and received by the electronic proofing server via the database.

20. A computer-enabled apparatus for gathering property data of a property having a location comprising:
    a first storage means for storing a property data request;
    a processor for selecting a mobile device based on the location of the property and transferring the property data request from the first storage means to the selected mobile device to allow the selected mobile device to gather the property data;
    a second storage means, coupled to the mobile device, for receiving the property data via the selected mobile device; and proofing means, coupled to the second storage means, for electronically error checking the property data by applying a predefined mathematical algorithm.

21. The apparatus of claim 20 further comprising a third storage means connected to the proofing means for storing the property data.

22. The apparatus of claim 20 further comprising a delivery means, connected to the third storage means, for delivering property data to a requester.

23. The apparatus of claim 20 wherein the mobile device connects to said first and second storage means using a wireless or wired connection.

24. The apparatus of claim 20 wherein said mobile device is a personal digital assistant or a tablet pc.

25. The apparatus of claim 20 further comprising a property database, connected to the first storage means, for checking that the property for which the property data request was generated may be located.

26. The apparatus of claim 20 further comprising a property data database, connected to the first storage means, for checking that property data for the property for which the property data request has been made has not already been saved.

27. The apparatus of claim 20 wherein the predefined mathematical algorithm is based on a function of tax data or title data, and wherein the tax data or the title data is relatable to the property data and received by the proofing means via the second storage means.

* * * * *